United States Patent
Patel et al.

(10) Patent No.: US 10,156,963 B2
(45) Date of Patent: Dec. 18, 2018

(54) REPORT MANAGEMENT SYSTEM

(71) Applicant: ADP, LLC, Roseland, NJ (US)

(72) Inventors: Amitkumar Patel, Bridgewater, NJ (US); Renata Vieira Palazzo, Porto Alegre (BR); Diego Tremper, Porto Alegre (BR); Leandro da Silva Bianchini, Porto Alegre (BR); Roberto Rodrigues Dias, Porto Alegre (BR)

(73) Assignee: ADP, LLC, Roseland, NJ (US)

(*) Notice: Subject to any disclaimer, the term of this patent is extended or adjusted under 35 U.S.C. 154(b) by 630 days.

(21) Appl. No.: 14/792,071

(22) Filed: Jul. 6, 2015

(65) Prior Publication Data

US 2017/0010761 A1    Jan. 12, 2017

(51) Int. Cl.
*G06F 3/0482* (2013.01)
*G06Q 10/10* (2012.01)
*G06F 3/0484* (2013.01)
*G06F 3/0481* (2013.01)
*G06F 17/24* (2006.01)

(52) U.S. Cl.
CPC .......... *G06F 3/0482* (2013.01); *G06F 3/0481* (2013.01); *G06F 3/04817* (2013.01); *G06F 3/04842* (2013.01); *G06F 17/243* (2013.01); *G06Q 10/10* (2013.01)

(58) Field of Classification Search
CPC .. G06F 3/0482; G06F 3/0481; G06F 3/04817; G06F 17/243; G06F 3/04842; G06Q 10/10
See application file for complete search history.

(56) References Cited

U.S. PATENT DOCUMENTS

| | | | |
|---|---|---|---|
| 5,970,466 A | 10/1999 | Detjen et al. | |
| 6,952,695 B1 | 10/2005 | Trinks et al. | |
| 7,289,976 B2 | 10/2007 | Kihneman et al. | |
| 7,500,201 B2 | 3/2009 | Treibach-Heck et al. | |
| 7,562,303 B2 | 7/2009 | Sarma et al. | |
| 2002/0082895 A1 | 6/2002 | Budka et al. | |
| 2003/0017443 A1* | 1/2003 | Kilgore | G09B 3/06 434/350 |
| 2004/0049465 A1 | 3/2004 | Engler et al. | |
| 2004/0168119 A1 | 8/2004 | Liu et al. | |
| 2004/0255239 A1* | 12/2004 | Bhatt | G06F 17/30994 715/225 |
| 2010/0218092 A1 | 8/2010 | Xiang et al. | |

(Continued)

*Primary Examiner* — Jeffrey A Gaffin
*Assistant Examiner* — Ayesha E Huertas Torres
(74) *Attorney, Agent, or Firm* — Yee & Associates, P.C.

(57) ABSTRACT

A method and apparatus for generating reports. A computer system displays an application with fields in a graphical user interface on a display system. The application is used to perform transactions for an organization. The computer system identifies a group of the fields displayed in the graphical user interface that is selectable for use in a group of the reports. The computer system displays a group of graphical indicators in association with the group of the fields in the graphical user interface. The computer system receives a selection of a portion of the group of the fields displayed in the graphical user interface in user input. The computer system creates the group of the reports using the portion of the group of the fields. The computer system sends the group of the reports to an output device, enabling performing an operation for the organization using the group of the reports.

25 Claims, 14 Drawing Sheets

(56) References Cited

U.S. PATENT DOCUMENTS

| | | |
|---|---|---|
| 2013/0041677 A1 | 2/2013 | Nusimow et al. |
| 2013/0246396 A1 | 9/2013 | Clare et al. |
| 2013/0251233 A1 | 9/2013 | Yang et al. |
| 2014/0013244 A1 | 1/2014 | Lindsay et al. |
| 2014/0214579 A1* | 7/2014 | Shen ................ G06F 19/28 705/26.1 |
| 2016/0179930 A1* | 6/2016 | Radivojevic ........ G06F 3/0482 707/792 |

* cited by examiner

REPORT MANAGEMENT SYSTEM

BACKGROUND INFORMATION

1. Field

The present disclosure relates generally to an improved computer system and, in particular, to a method and apparatus for managing reports. Still more particularly, the present disclosure relates to a method and apparatus for creating new reports for applications.

2. Background

Information systems are used for many different purposes. The different operations performed using the information system may be referred to as transactions. For example, an information system may be used to process payroll to generate paychecks for employees in an organization. The different operations performed to generate paychecks for a pay period using the information system may be referred to as a transaction.

Additionally, an information system also may be used by a human resources department to maintain benefits and other records about employees. For example, a human resources department may manage health insurance, wellness plans, and other programs in an organization using an employee information system. As yet another example, an information system may be used to determine when to hire new employees, assign employees to projects, perform reviews for employees, and other suitable operations for the organization.

Other uses of information systems include purchasing equipment and supplies for an organization. In yet another example, information systems may be used to plan and rollout a promotion of a product for an organization.

Often times, an operator may desire to generate a report for a particular type of transaction. Currently, the operator may use report generator software to generate reports that are human readable from different sources such as databases in the information systems. Currently available report generator software are often more difficult to use than desired.

This type of software requires the operator to have knowledge about how information is stored to select what information to use in a report. For example, the operator may need to know what fields, tables, or columns in the database should be selected for including desired information in the report.

As a result, an operator may need to have experience or training with respect to report generator software and databases in addition to the experience and training to perform the transaction for which the report is being generated. This additional skill may limit the number of operators who are able to generate reports. Additionally, operators who do not generate reports very often may find that report generating may take more time and may be more difficult than desired.

Therefore, it would be desirable to have a method and apparatus that takes into account at least some of the issues discussed above, as well as other possible issues. For example, it would be desirable to have a method and apparatus that overcomes the technical problem with operators performing transactions being unable to generate reports as efficiently as desired without knowledge about how the information is stored.

SUMMARY

An embodiment of the present disclosure provides a method for generating reports. A computer system displays an application with fields in a graphical user interface on a display system. The application is used to perform transactions for an organization. The computer system identifies a group of the fields displayed in the graphical user interface that is selectable for use in a group of the reports. Further, the computer system displays a group of graphical indicators in association with the group of the fields in the graphical user interface. Still further, the computer system receives a selection of a portion of the group of the fields displayed in the graphical user interface in user input. Yet still further, the computer system creates the group of the reports using the portion of the group of the fields. The computer system also sends the group of the reports to an output device, enabling performing an operation for the organization using the group of the reports.

Another embodiment of the present disclosure provides another method for generating reports. A computer system displays an application with fields in a graphical user interface on a display system. The application is used to perform transactions for an organization. The computer system identifies a group of the fields displayed in the graphical user interface that are selectable for use in a group of the reports. Further, the computer system displays a group of graphical indicators in association with the group of the fields in the graphical user interface. Still further, the computer system displays a selection area with a list of the group of the fields. The computer system receives a selection of a portion of the group of the fields made from user input to at least one of the group of the fields displayed in the graphical user interface on the display system or the list displayed in the selection area. Yet still further, the computer system creates the group of the reports using the portion of the group of the fields. The computer system also stores the group of the reports in the graphical user interface on the display system, enabling performing an operation for the organization using the group of the reports.

Yet another embodiment of the present disclosure provides a computer system comprising a display system and a report generator in communication with the display system. The report generator displays an application with fields in a graphical user interface on the display system. The application is used to perform transactions for an organization. The application also identifies a group of the fields displayed in the graphical user interface that is selectable for use in a group of reports. Further, the application displays a group of graphical indicators in association with the group of the fields in the graphical user interface. Still further, the application receives a selection of a portion of the group of the fields displayed in the graphical user interface in user input. Yet still further, the application creates a group of the reports using the portion of the group of the fields. The application also sends the group of the reports to an output device, enabling performing an operation for the organization using the group of the reports.

Still another embodiment of the present disclosure provides computer program product for generating reports. The computer program product comprises a computer readable storage media, and first program code, second program code, third program code, fourth program code, fifth program code, and sixth program code stored on the computer readable storage media. The first program code displays an application with fields in a graphical user interface on a display system. The application is used to perform transactions for an organization. The second program code identifies a group of the fields displayed in the graphical user interface that is selectable for use in a group of the reports. The third program code displays a group of graphical indicators in association with the group of the fields in the graphical user interface. The fourth program code receives a selection of a portion of the group of the fields displayed in the graphical user interface in user input. The fifth program code creates the group of the reports using the portion of the group of the fields. The sixth program code sends the group of the reports to an output device, enabling performing an operation for the organization using the group of the reports.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a graphical user interface for generating reports in accordance with an illustrative embodiment;

FIG. 12 is another illustration of a graphical user interface for generating reports in accordance with an illustrative embodiment;

FIG. 13 is another illustration of a graphical user interface for generating reports in accordance with an illustrative embodiment;

FIG. 18 is another illustration of a graphical user interface for generating reports in accordance with an illustrative embodiment;

DETAILED DESCRIPTION

The illustrative embodiments recognize and take into account one or more different considerations. For example, the illustrative embodiments recognize and take into account that the process currently used to generate reports may be more cumbersome and difficult than desired. For example, an operator, who desires to generate a report for a transaction being performed using an application, exits or leaves the application and starts a new application for generating reports, such as currently used report generator software.

The illustrative embodiments also recognize and take account that currently available report generator software uses the names of columns, fields, tables, or other data structures in presenting selections to an operator. The illustrative embodiments recognize and take into account that often times, the names used in a database may not be the same as the name of the field as displayed in the application used by the operator to perform the transaction.

Thus, those embodiments provide a method and apparatus for managing reports. In particular, a method may be present that helps an operator generate a new report more quickly and easily as compared to currently available report generator software.

In one illustrative example, a method is present for generating reports. An application with fields is displayed in a graphical user interface on a display system. The application is used to perform transactions for an organization. A group of fields displayed in the graphical user interface that are selectable for use in a group of reports is identified. A group of graphical indicators is displayed in association with the group of the fields in the graphical user interface. A group of selected fields from the group of fields displayed in the graphical user interface is received in a user input. A group of new reports is created using the group of selected fields. The group of new reports is stored in the computer system, enabling performing the operation for an organization using the group of new reports.

As used herein, "a group of," when used with reference to items, means one or more items. For example, a group of reports is one or more reports.

A field is a space that holds a piece of data. The space may be, for example, in a location in a record for a database. As another example, the space may be in a location of memory of a computer system. When the space is in an application, the space may be in a data structure in the application.

Figure 1:
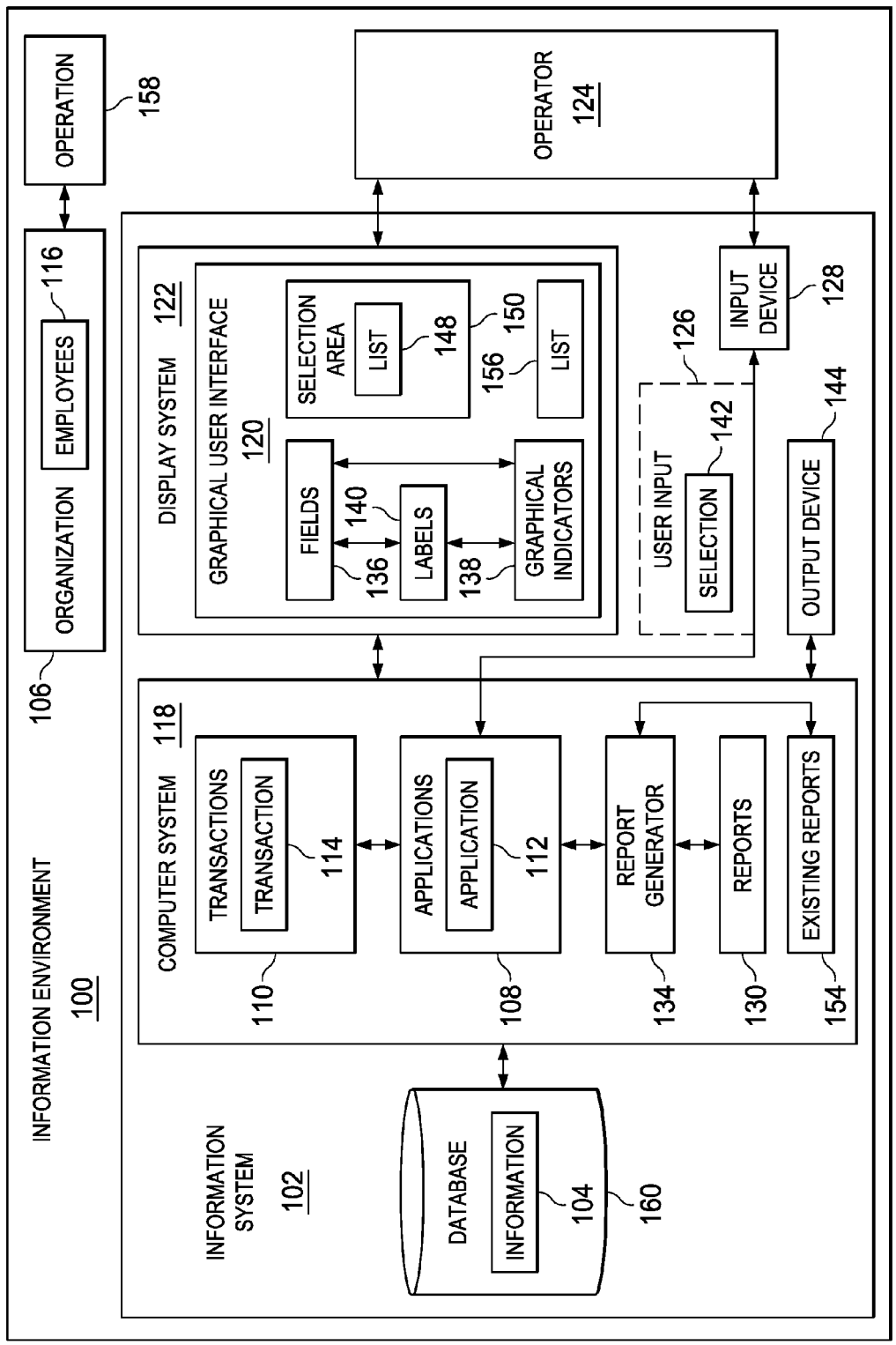
FIG. 1 is an illustration of a block diagram of an information environment in accordance with an illustrative embodiment.

With reference now to the figures, and in particular with reference to FIG. 1, an illustration of a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other information relating to or used by organization 106.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may be selected from one of an employee information system, a research information system, a sales information system, an accounting system, a payroll system, or some other type of information system that stores and provides access to information 104 about organization 106.

In this illustrative example, information system 102 includes different components. As depicted, information system 102 includes applications 108. As depicted, applications 108 are software used to perform transactions 110 using information system 102.

For example, application 112 in applications 108 may be used to perform transaction 114 in transactions 110. For example, application 112 may be a payroll application. Transaction 114 may be, for example, generating checks for a payroll for employees 116 in organization 106. As another example, application 112 may be a benefits application, and transaction 114 may be an addition of a new hire in employees 116 in organization 106.

In this illustrative example, applications 108 run in computer system 118 and are displayed in graphical user interface 120 in display system 122. Computer system 118 is a hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

As depicted, display system 122 is a hardware system and includes one or more display devices on which graphical user interface 120 may be displayed. Display system 122 provides a visualization of information 104 to operator 124. The display devices may include at least one of a light emitting diode display (LED), a liquid crystal display (LCD), an organic light emitting diode display (OLED), or some other suitable device on which graphical user interface 120 may be displayed.

In the illustrative example, operator 124 is a human person and interacts with application 112 to perform transaction 114. Operator 124 may interact with graphical user interface 120 through user input 126 generated by input device 128 for computer system 118. Input device 128 may be, for example, a mouse, a keyboard, a trackball, a touchscreen, a stylus, or some other suitable type of input device.

In performing transaction 114, operator 124 may desire to generate a group of reports 130. A group of reports 130 may be generated with respect to transaction 114.

In the illustrative example, information system 102 also includes report generator 134. Report generator 134 is located in computer system 118.

For example, report generator 134 may be located on a client data processing system in computer system 118 that is directly used by operator 124. For example, report generator 134 may be located on a work station, a tablet computer, a mobile phone, or some other client side device.

In another example, report generator 134 may be located on a server computer that is remote to the data processing system used by operator 124. For example, report generator 134 may be part of a service in a cloud computing system in computer system 118 that is accessed by a client data processing system over the Internet. Alternatively, report generator 134 may be distributed between a client data processing system and a server computer.

Report generator 134 may be implemented in software, hardware, firmware or a combination thereof. When software is used, the operations performed by report generator may be implemented in program code configured to run on hardware, such as a processor unit. When firmware is used, the operations performed by report generator 134 may be implemented in program code and data and stored in persistent memory to run on a processor unit. When hardware is employed, the hardware may include circuits that operate to perform the operations in report generator.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Report generator 134 provides a method for generating reports 130. In this illustrative example, report generator 134 displays application 112 with fields 136 in graphical user interface 120 on display system 122. Application 112 is used to perform transactions 110 for organization 106.

Fields 136 are spaces for pieces of data. For example, in a relational database table, the columns of the table are the fields. The rows of the table are records. The records in the table are values for the fields. In this illustrative example, fields 136 are spaces where pieces of data for application 112 are located. These pieces of data are used to perform transactions 110 for organization 106. For example, when application 112 is a payroll application, fields 136 include at least one of salary, tax information, or other suitable types of payroll data.

As depicted, report generator 134 identifies a group of fields 136 displayed in graphical user interface 120 that is selectable for use in generating a group of reports 130. Report generator 134 displays a group of graphical indicators 138 in association with the group of fields 136 in graphical user interface 120.

In this illustrative example, graphical indicators 138 are considered to be displayed in association with fields 136 when graphical indicators 138 draw attention to fields 136. For example, the group of graphical indicators 138 is selected from at least one of color, font, bolding, underlining, animation, italics, highlighting, an icon, an image, intensity, or some other suitable mechanism for drawing the attention of operator 124 or some other person viewing fields 136 displayed for application 112 in graphical user interface 120.

For example, report generator 134 may display the group of graphical indicators 138 in association with a group of labels 140 for the group of fields 136 that are displayed with the group of fields 136 in graphical user interface 120. As depicted, highlighting, a change in intensity, bolding, or some other sort of graphical indicator may be applied to the group of labels 140 to indicate that the group of fields 136 may be used to generate a group of reports 130. Report generator 134 receives selection 142 of a portion of the group of fields 136 displayed in graphical user interface 120 in user input 126 as generated by operator 124 using input device 128.

Report generator 134 creates a group of reports 130 using a portion of the group of fields 136 that were selected. Report generator 134 sends the group of reports 130 to output device 144. In the illustrative example, output device 144 may take different forms. For example, output device 144 is hardware and may be selected from one of a hard disk, a printer, display system 122, a projector, or some other suitable device.

In another illustrative example, report generator 134 may also provide a visual indication of the group of fields 136 that may be selected through list 148. As depicted, report generator 134 displays selection area 150 with list 148 that includes the group of fields 136.

Selection area 150 may be displayed as part of application 112 displayed in graphical user interface 120. For example, selection area 150 may be a pop-up window, a frame, or some other suitable display mechanism. As depicted, list 148 may be a list of the group of labels 140 for the group of fields 136 that may be selected for use in generating the group of reports 130.

Further, existing reports 154 may be present. Existing reports 154 may have been generated by at least one of operator 124 or another operator. Report generator 134 may also let the operator know if any of existing reports 154 may be used. For example, report generator 134 searches for any of existing reports 154 that have a portion of the group of fields 136. Report generator 134 displays list 156 of existing reports 154 that includes a portion of the group of fields 136. In this manner, a prior report in existing reports 154 may be used rather than operator 124 creating a new report. This feature also may enable at least one of increased uniformity or less duplication in existing reports 154.

In this manner, the use of report generator 134 enables performing operation 158 for organization 106 using the group of reports 130. Operation 158 may be performed with respect to employees 116 or other people in organization 106. Operation 158 may be selected from one of setting compensation, performing a review, assigning a task, hiring, reorganization, purchasing items, shipping items, research for a new product, product planning, or other suitable real world operations.

Previously, operator 124 would leave application 112 and start a report generator application in applications 108 to generate the group of reports 130. All of the selections would take place in the report generator application.

The illustrative embodiments recognize and take account that this process may be more time-consuming and complex than desired for operator 124. For example, when information 104 for transaction 114 is stored in database 160, operator 124 is required to have knowledge about database 160 in generating the group of reports 130.

In the illustrative example, operator 124 may remain in application 112. For example, selection 142 is made in the display of application 112. The group of graphical indicators 138 is displayed in association with the group of fields 136 that are used by operator 124 to perform transaction 114 using application 112 in information system 102. The selection of fields 136 is made from user input 126 as part of the interaction with application 112.

In other words, operator 124 does not need to open a new application in applications 108 and turn attention away from application 112 while performing transaction 114 or wait until transaction 114 is complete. The selection of fields 136 is made as part of the display of fields 136 by application 112.

Thus, the illustrative example provides one or more technical solutions to the technical problem with operators performing transactions being unable to generate reports as efficiently as desired without knowledge about how the information is stored. In the illustrative example, report generator 134 provides visualization of fields 136 as displayed in application 112 along with an indication of which ones of fields 136 may be selected for use in generating the group of reports 130.

As depicted, report generator 134 displays graphical indicators 138 in association with fields 136. Graphical indicators 138 provide a visual indication of which ones of fields 136 may be selected for use in reports 130. This selection may be performed while operator 124 uses application 112. In other words, operator 124 may select one or more fields from the group of fields 136 that are selectable for the group of reports 130 while viewing application 112.

As a result, this technical solution to the technical problem of generating reports provides a technical effect in which a group of reports 130 are generated more easily and quickly while requiring less knowledge or training from operator 124. Additionally, a technical effect is present that increases the ease in which operation 158 may be identified and performed for organization 106.

Additionally, report generator 134 may provide graphical indicators 138 in association with labels 140. In this manner, report generator 134 provides operator 124 with a visualization of a description of fields 136 in a manner that is familiar to operator 124. As result, operator 124 does not need to know how the labels for fields 136 in database 160 correspond to labels 140. This feature is useful when labels 140 for fields 136 as displayed in application 112 in graphical user interface 120 are not the same as the labels used for fields 136 as stored in a data structure such as database 160.

In this manner, operator 124 does not need to have knowledge or experience with database 160.

Computer system 118 is a special purpose computer system in which report generator 134 in computer system 118 enables generating reports 130 more quickly and more efficiently as compared to currently used report generators. In particular, report generator 134, as described, transforms computer system 118 into a special purpose computer system as compared to currently available general computer systems that do not have report generator 134.

Computer system 118 performs a transformation of data to provide a visualization of fields 136 while fields 136 are displayed in application 112. As a result, fields 136 are not merely displayed in application 112 in graphical user interface 120. Much more occurs in the display of fields 136. For example, fields 136 that can be selected for use in a group of reports 130 are visually indicated to operator 124. As depicted, this visual indication of fields 136 that may be selected for a group of reports 130 occurs through the use of a group of graphical indicators 138 that are displayed in association with the group of fields 136.

Figure 2:
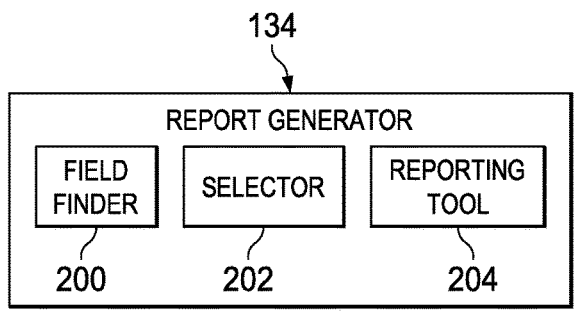
FIG. 2 is an illustration of a block diagram of a report generator in accordance with an illustrative embodiment.

With reference next to FIG. 2, an illustration of a block diagram of a report generator is depicted in accordance with an illustrative embodiment. This figure shows one example of an implementation for report generator 134 in FIG. 1. In this illustrative example, report generator 134 has a number of different components. As depicted, report generator 134 includes field finder 200, selector 202, and reporting tool 204. The reuse of a reference numeral in different figures represents the same element in the different figures.

Field finder 200 identifies the group of fields 136 displayed for application 112 in graphical user interface 120 that is selectable for use in the group of reports 130. In this illustrative example, when a field is selectable for use in the group of reports 130, the field may be selected for use as a column in one report of the group of reports 130.

For example, when the field is selected for a report, the output of the report includes the column for the field. When the field is for a column in a relational database table, the output of the report includes the values for the column of records in the table.

As depicted, selector 202 displays the group of graphical indicators 138 in association with the group of fields 136 in graphical user interface 120. Selector 202 also receives selection 142 of a portion of the group of fields 136 displayed in graphical user interface 120.

In this illustrative example, reporting tool 204 creates the group of reports 130 using the portion of the group of fields 136. Reporting tool 204 sends the group of reports 130 to output device 144.

Figure 3:
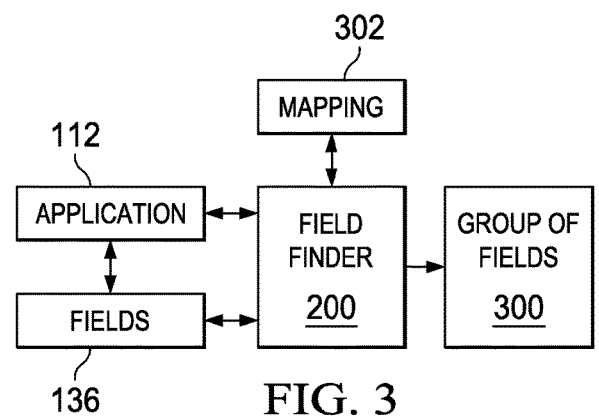
FIG. 3 is an illustration of a block diagram of data flow for identifying a group of fields of an application in accordance with an illustrative embodiment.

With reference next to FIG. 3, an illustration of a block diagram of data flow for identifying a group of fields of an application is depicted in accordance with an illustrative embodiment. This figure shows one example of data flow for identifying a group of fields 136 of application 112 through field finder 200 in FIG. 2.

In this figure, an example of data flow for identifying group of fields 300 that is selectable for use in group of reports 130 through field finder 200 is shown. As shown in this figure, field finder 200 identifies group of fields 300 using mapping 302. Mapping 302 provides an identification of which ones of fields 136 may be selected as group of fields 300 for the group of reports 130. In this illustrative example, mapping 302 is a data structure that identifies which of the fields in application 112 are the group of fields 136 that are selectable for use in the group of reports 130.

In this illustrative example, field finder 200 identifies mapping 302 in at least one of application 112 or some other suitable location in information environment 100. For example, when mapping 302 is located in application 112, field finder 200 may parse application 112 to identify mapping 302 in application 112. As another example, mapping 302 may be located in a database in information environment 100 in FIG. 1.

As still another example, field finder 200 retrieves mapping 302 using an application programming interface. In this example, the application programming interface may be provided by at least one of application 112, information system 102, or some other suitable component in information environment 100 in FIG. 1.

Figure 4:
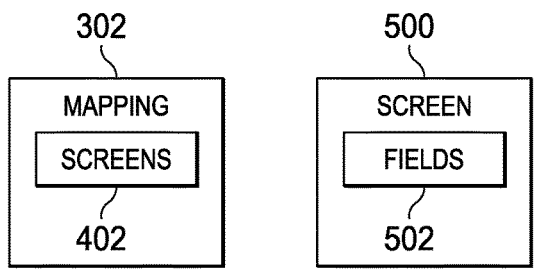
FIG. 4 is an illustration of a block diagram of mapping in accordance with an illustrative embodiment.

With reference now to FIG. 4, an illustration of a block diagram of mapping is depicted in accordance with an illustrative embodiment. In this illustration, mapping 302 includes a group of screens 402 for application 112.

In this illustrative example, the group of screens 402 for application 112 are groups of fields displayed in graphical user interface 120. The group of screens 402 is used to perform transactions 110. For example, when application 112 is a payroll application, screens 402 for application 112 may include at least one of a screen for generating payroll checks, a screen for generating tax forms, or other suitable types of screens for payroll applications.

Figure 5:
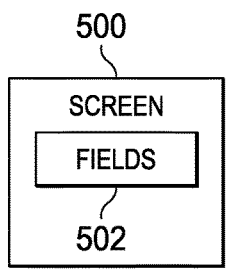
FIG. 5 is an illustration of a block diagram of a screen in accordance with an illustrative embodiment.

Turning to FIG. 5, an illustration of a block diagram of a screen is depicted in accordance with an illustrative embodiment. In this illustration, screen 500 is an example of a screen in the group of screens 402 in mapping 302 in FIG. 4.

As depicted, screen 500 includes a group of fields 502. The group of fields 502 for screen 500 is an example of fields 136 for application 112 in FIG. 1. For example, when screen 500 is for generating payroll checks, the group of fields 502 is one or more fields displayed on graphical user interface 120 for entering the payroll checks on screen 500 for application 112.

Figure 6:
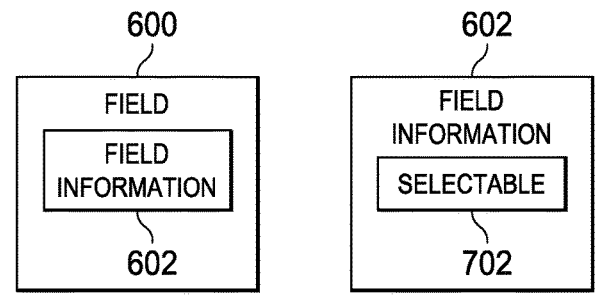
FIG. 6 is an illustration of a block diagram of a field in accordance with an illustrative embodiment.

Turning next to FIG. 6, an illustration of a block diagram of a field is depicted in accordance with an illustrative embodiment. In this illustration, field 600 is an example of a field in the group of fields 502 in screen 500 in FIG. 5.

In this illustrative example, field 600 includes field information 602. As depicted, field information 602 is information used by report generator 134 to at least one of identify whether field 600 is the group of fields 136 that are selectable for generating the group of reports 130, or identify a group of functions for field 600 that are selectable for generating information relating to field 600 for the group of reports 130.

Figure 7:
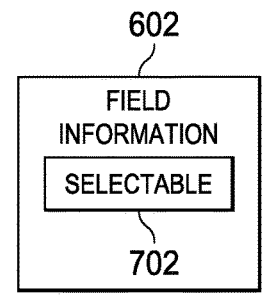
FIG. 7 is an illustration of a block diagram of field information in accordance with an illustrative embodiment.

Turning now to FIG. 7, an illustration of a block diagram of field information is depicted in accordance with an illustrative embodiment. In this illustration, field information 602 includes selectable 702.

As depicted, selectable 702 is a value that indicates whether field 600 is selectable for use in the group of reports 130. When the value for selectable 702 is true, field 600 is selectable for use in the group of reports 130. When the value for selectable 702 is false, field 600 is not selectable for use in the group of reports 130.

Figure 8:
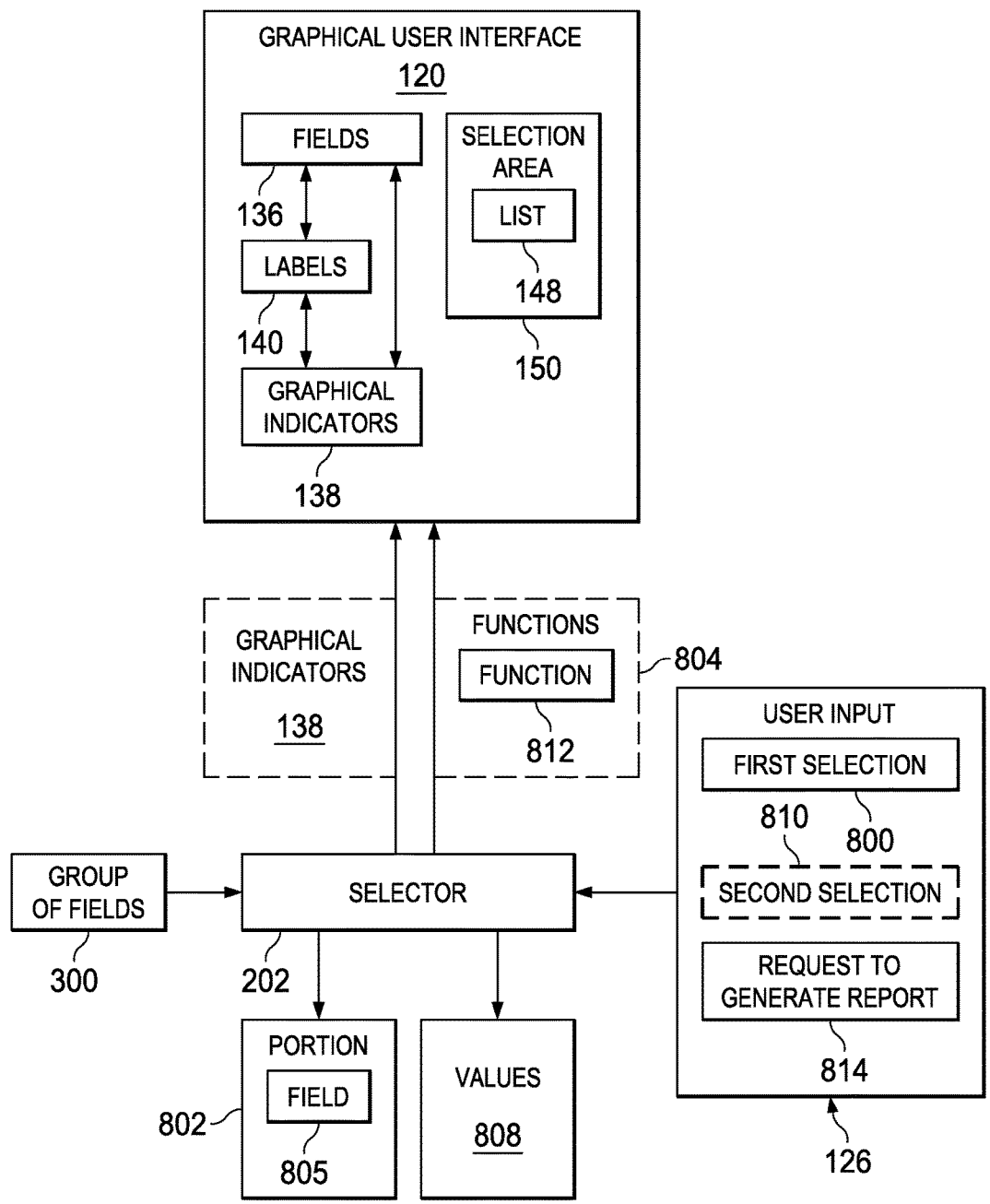
FIG. 8 is an illustration of a block diagram of data flow for displaying a group of graphical indicators in association with a group of fields of an application in accordance with an illustrative embodiment.

With reference to FIG. 8, an illustration of a block diagram of data flow for displaying a group of graphical indicators in association with a group of fields of an application is depicted in accordance with an illustrative embodiment. In this figure, an example of data flow for displaying the group of graphical indicators 138 in association with group of fields 300 in graphical user interface 120 through selector 202 is shown.

In this illustrative example, selector 202 displays the group of graphical indicators 138 in graphical user interface 120 in association with the group of labels 140 for group of fields 300. For example, selector 202 may display the group of graphical indicators 138 in graphical user interface 120 when selector 202 receives group of fields 300 from field finder 200. Selector 202 displays the group of graphical indicators 138 to indicate that group of fields 300 displayed in graphical user interface 120 are selectable for use in generating the group of reports 130.

Selector 202 also receives first selection 800 of portion 802 of group of the fields 300 displayed in graphical user interface 120. First selection 800 is an example of selection 142 in FIG. 1. In this illustrative example, portion 802 is a group of fields selected from group of fields 300.

Selector 202 modifies the group of graphical indicators 138 in graphical user interface 120 for portion 802. Selector 202 modifies the group of graphical indicators 138 to indicate portion 802 of group of fields 300 that is selected for use in generating the group of reports 130. For example, selector 202 may set labels 140 for fields 136 in portion 802 to a first color and labels 140 for fields 136 not in portion 802 to a second color.

In this illustrative example, selector 202 places the group of labels 140 for portion 802 of group of fields 300 in list 148. As depicted, selector 202 displays list 148 in selection area 150 on graphical user interface 120. List 148 indicates which of fields 136 are selectable for generating the group of reports 130. First selection 800 is selected from at least one of the group of graphical indicators 138 displayed on graphical user interface 120 for group of fields 300, the group of labels 140 displayed on graphical user interface 120 for group of fields 300, or the group of labels 140 placed in list 148 for group of fields 300.

As depicted, portion 802 includes field 805. Selector 202 displays a group of functions 804 for field 805 on graphical user interface 120. Selector 202 displays the group of functions 804 when selector 202 receives first selection 800.

In this illustrative example, the group of functions 804 is selected from at least one of statistical functions, retrieval functions, or some other suitable type of functions that generate the group of values 808 for field 805. A statistical function calculates at least one of a sum, a mean, a median, a mode, or some other suitable type of statistical value. Retrieval functions are functions that get values from another source. For example, a retrieval function may retrieve the group of values 808 from at least one of a database, the internet, or some other suitable source.

Selector 202 receives second selection 810 in user input 126. Second selection 810 selects function 812 in the group of functions 804 for field 805. In this illustrative example, selector 202 uses function 812 to generate a group of values 808 for field 805 for the group of reports 130.

For example, when field 805 is salary of employees 116 and function 812 is the statistical function for mean, the group of values 808 is calculated as the mean for the salaries for employees 116. As another example, when field 805 is an industry average salary comparison to the salary of employees 116 and function 812 is a retrieval function for industry average salaries, the group of values 808 may be retrieved from a service that provides industry average salaries for employees.

In this illustrative example, user input 126 includes request to generate report 814. As depicted, selector 202 receives request to generate report 814. When selector 202 receives request to generate report 814, selector 202 sends portion 802 and the group of values 808 for field 805 to reporting tool 204 to use in creating the group of reports 130.

Figure 9:
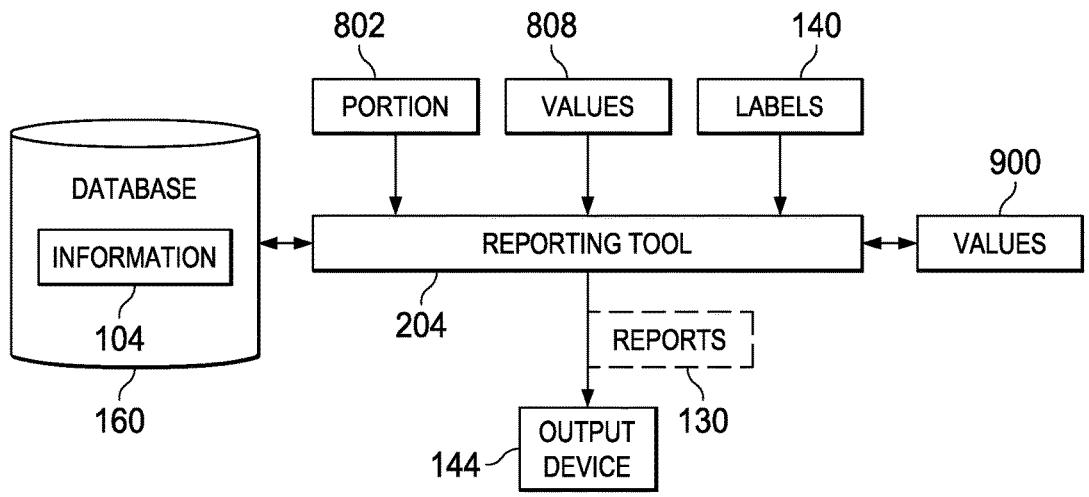
FIG. 9 is an illustration of a block diagram of data flow for creating reports in accordance with an illustrative embodiment.

With reference next to FIG. 9, an illustration of a block diagram of data flow for creating reports is depicted in accordance with an illustrative embodiment. In this figure, an example of data flow for creating the group of reports 130 using portion 802 of group of fields 300 through reporting tool 204 is shown.

In this illustrative example, reporting tool 204 receives portion 802 of group of fields 300 from selector 202. Reporting tool 204 identifies a group of values 900 for portion 802 of group of fields 300.

For example, reporting tool 204 may retrieve the group of values 900 from information 104 in database 160 for portion 802. In this example, reporting tool 204 may use structured query language (SQL) select statements to retrieve columns of information 104 in database 160 for portion 802 of group of fields 300. As another example, reporting tool 204 may use the group of values 808 for field 805 as the group of values 900 for field 805.

Reporting tool 204 creates the group of reports 130 using the group of values 808. For example, a report in the group of reports 130 may be a table. In this illustrative example, reporting tool 204 may generate the table using portion 802 of group of fields 300 as the columns of the table, the group of values 900 as the values in the table, and the group of labels 140 for portion 802 as the headings for the columns of the table.

As depicted, reporting tool 204 sends the group of reports 130 to output device 144. For example, reporting tool 204 may send the group of reports 130 to output device 144 while reporting tool 204 is creating the group of reports 130.

Figure 10:
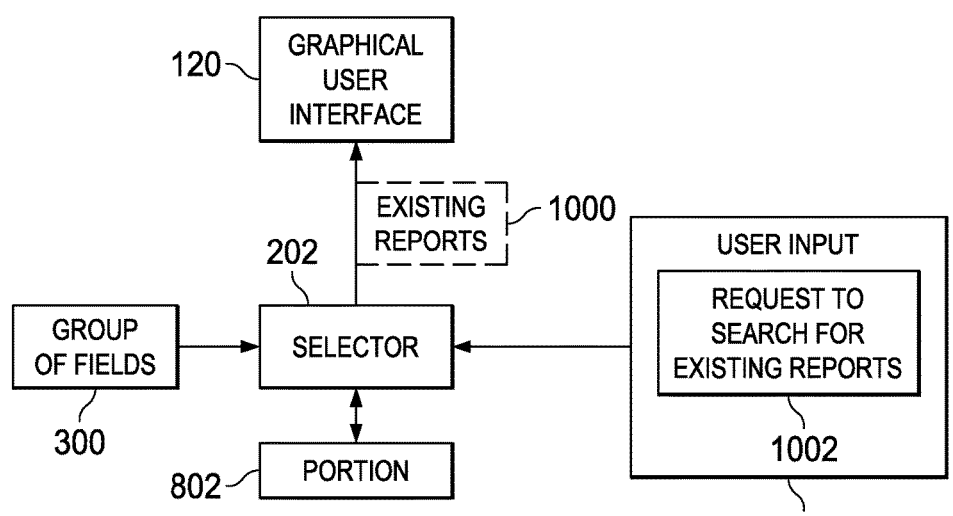
FIG. 10 is an illustration of a block diagram of data flow for displaying a list of existing reports in accordance with an illustrative embodiment.

With reference now to FIG. 10, an illustration of a block diagram of data flow for displaying a list of existing reports is depicted in accordance with an illustrative embodiment. In this figure, an example of data flow for displaying a list of existing reports 1000 in graphical user interface 120 through selector 202 is shown.

In this illustrative example, selector 202 receives request to search for existing reports 1002 in user input 126. Request to search for existing reports 1002 is a request to search for reports already existing in information environment 100 in FIG. 1 that includes portion 802 of group of fields 300.

As depicted, when selector 202 receives request to search for existing reports 1002, selector 202 identifies the list of existing reports 1000 that include portion 802 of group of fields 300. In this illustrative example, selector 202 compares portion 802 of group of fields 300 to fields of existing reports 1000 in information environment 100. In the comparison, selector 202 identifies whether at least one of all fields in portion 802 or one field in portion 802 is located in a report in information environment 100. As depicted, selector 202 adds the report to the list of existing reports 1000 when the comparison indicates that at least one field in portion 802 is located in the report. In this illustrative example, selector 202 arranges the list of existing reports 1000 based on the comparison. For example, a report having two fields in portion 802 will be shown higher in the list than a report having one field in portion 802.

In this illustrative example, selector 202 displays the list of existing reports 1000 on graphical user interface 120. Displaying the list of existing reports 1000 enables operator 124 to perform operation 158 for organization 106 using the list of existing reports 1000.

The illustrations of information environment 100 and the different components in FIGS. 1-10 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, selection area 150 may be displayed in place of the group of graphical indicators 138 displayed in association with the group of fields 136. As another example, although report generator 134 is shown as a separate block, this function may be implemented as part of application 112.

As another example, report generator 134 also may be distributed through or in communication with application 112. As a result, operator 124 may select fields 136 not only for application 112 but for any of applications 108. In this manner, operator 124 may move from application to application in applications 108 as needed to see the group of fields 136 that are selectable in applications 108 that may be used to form a group of reports 130. The visualization of fields 136, labels 140 for fields 136, or both may allow operator 124 to more easily generate a group of reports. For example, the visualization of at least one of labels 140 or fields 136 in the context of the use of at least one of labels 140 or fields 136 in application 112 or throughout applications 108 may aid operator 124 in knowing which ones of the group of fields 136 are to be selected for generating reports 130.

Figure 11:
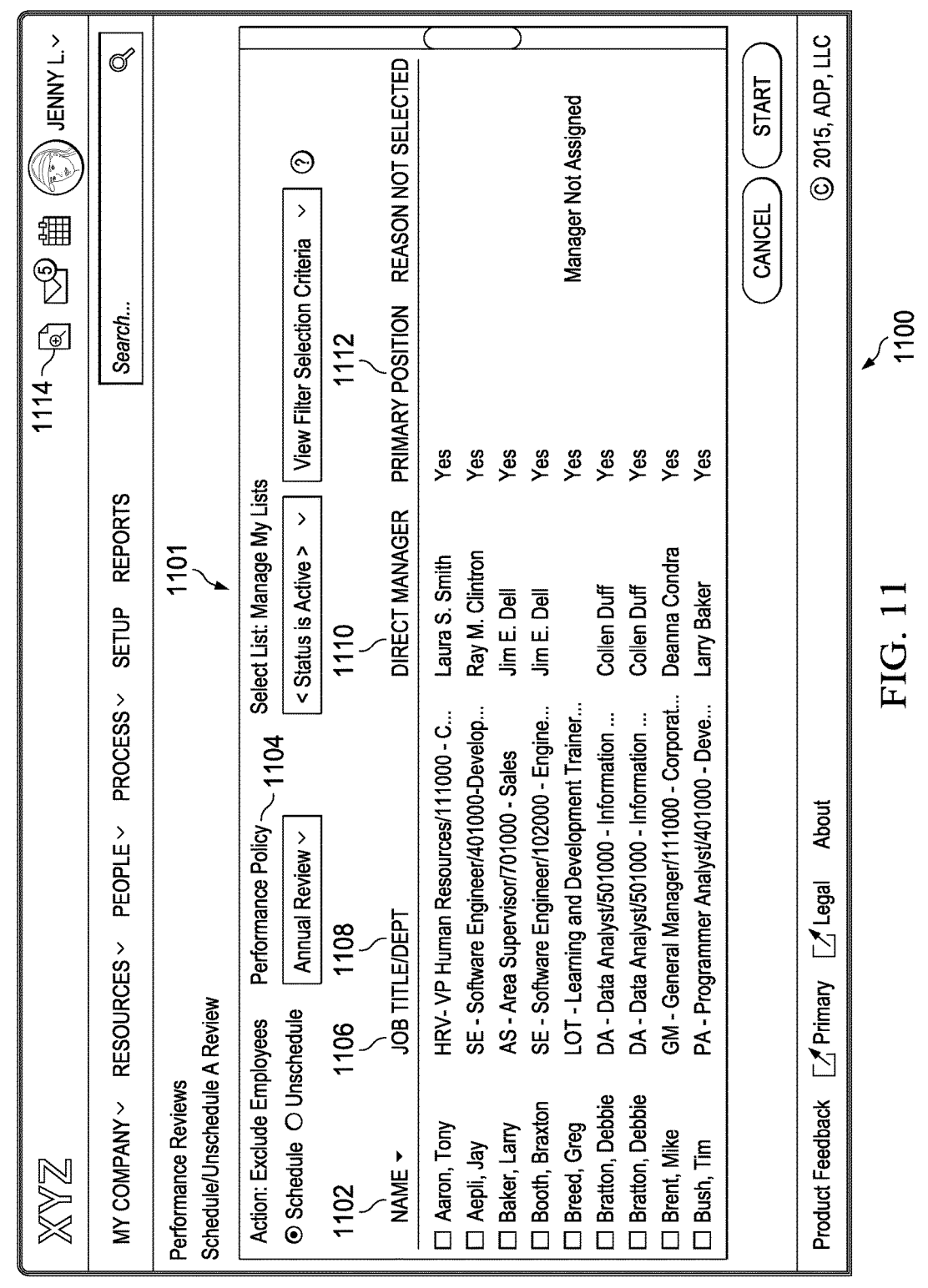

FIGS. 11-18 are illustrative examples of a graphical user interface that may be used to create reports for an application. With reference first to FIG. 11, an illustration of a graphical user interface for generating reports is depicted in accordance with an illustrative embodiment. As depicted, graphical user interface 1100 is an example of one implementation for graphical user interface 120 shown in block form in FIG. 1. In this illustration, fields in first screen 1101 for an application are depicted. The application schedules performance reviews of employees 116 in this example.

In this illustrative example, graphical user interface 1100 displays a number of different graphical elements. As depicted, graphical user interface 1100 includes field 1102, field 1104, field 1106, field 1108, field 1110, field 1112, and icon 1114. These fields are examples of the group of fields 136 shown in block form in FIG. 1. As depicted, icon 1114 is a button selected in graphical user interface 1100 to begin a process for generating reports.

Figure 12:
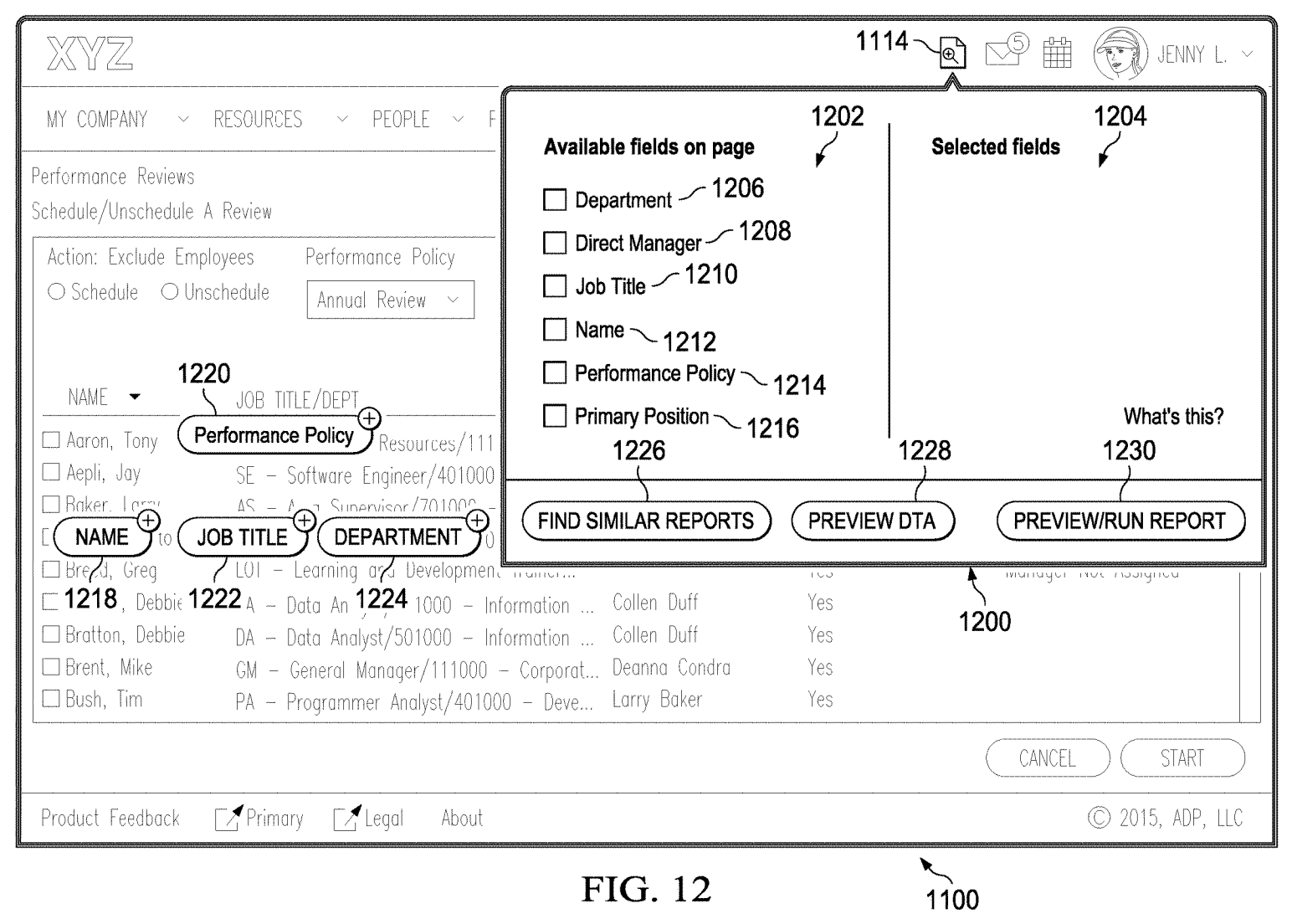

Turning next to FIG. 12, another illustration of a graphical user interface for generating reports is depicted in accordance with an illustrative embodiment. In this illustration, icon 1114 has been selected.

As depicted, selection area 1200 is displayed in graphical user interface 1100 when icon 1114 is selected. In this illustrative example, selection area 1200 is a pop-up window. Selection area 1200 is an example of selection area 150 shown in block form in FIG. 1. List 1202 is an example of list 148 shown in block form in FIG. 1. Portion 1204 is an example of portion 802 shown in block form in FIG. 8.

In this illustrative example, list 1202 includes field 1206, field 1208, field 1210, field 1212, field 1214, and field 1216. As depicted, graphical user interface 1100 includes graphical indicator 1218, graphical indicator 1220, graphical indicator 1222, and graphical indicator 1224. These graphical indicators are examples of the group of graphical indicators 138 shown in block form in FIG. 1.

As depicted, selection area 1200 includes button 1226 for beginning a process to search for reports; button 1228 for displaying a preview of a report; and button 1230 for generating the report.

Figure 13:
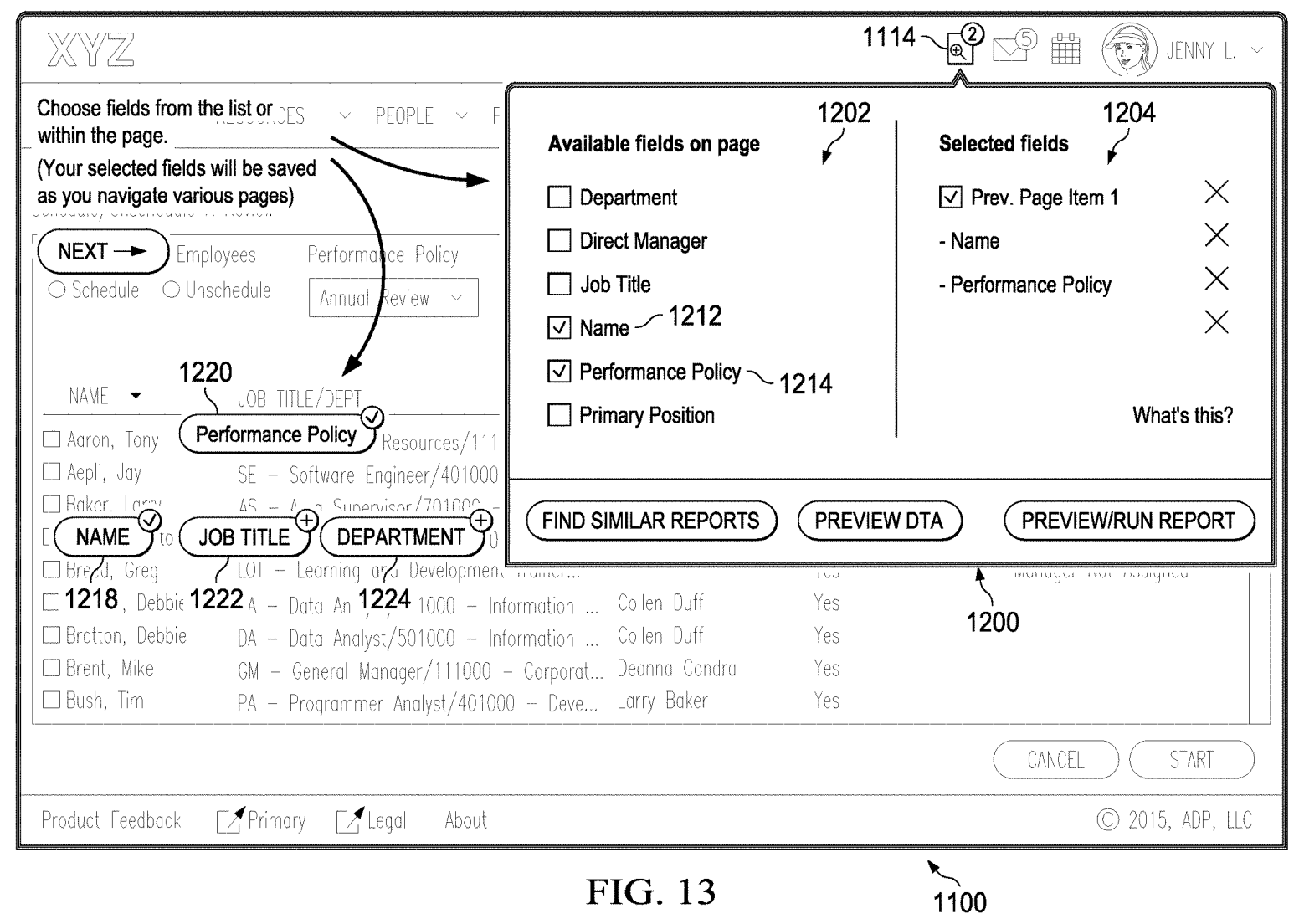

Turning now to FIG. 13, another illustration of a graphical user interface for generating reports is depicted in accordance with an illustrative embodiment. In this illustration, field 1212 and field 1214 have been selected.

In this illustrative example, the selection of field 1212 occurs when at least one of graphical indicator 1218 or field 1212 is selected. The selection of field 1214 occurs when at least one of graphical indicator 1220 or field 1214 is selected. As depicted, portion 1204 includes field 1212 and field 1214. In this illustrated example, the selection of field 1212 and field 1214 is made using at least one of a mouse button click on the fields, a mouse button click on the graphical indicators, a drag and drop operation using the graphical indicators, a keyboard selection of the fields, a keyboard selection of the graphical indicators, or some other suitable type of user input for selecting the fields in information environment 100.

Figure 14:
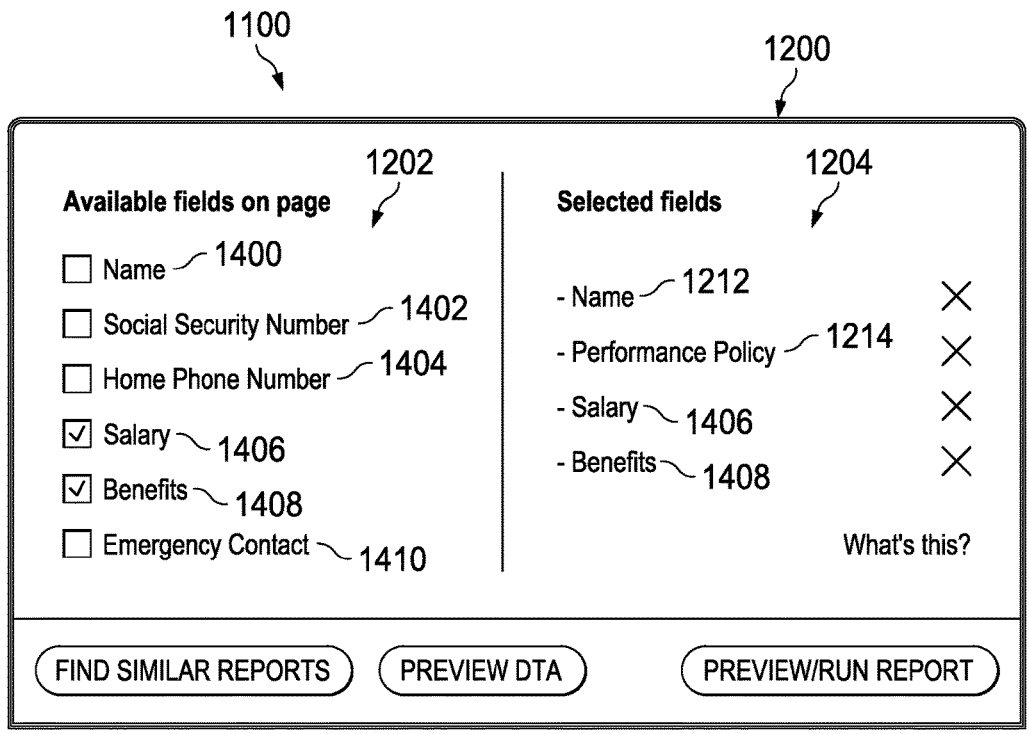
FIG. 14 is another illustration of a graphical user interface for generating reports in accordance with an illustrative embodiment.

With reference to FIG. 14, another illustration of a graphical user interface for generating reports is depicted in accordance with an illustrative embodiment. In this illustration, fields of a second screen in the application for scheduling performance reviews of employees 116 that are selectable for generating the group of reports 130 are shown.

As depicted, list 1202 has been modified to show the fields that are selectable for generating the group of reports 130 that are located in the second screen in the application for scheduling performance reviews for employees. In this illustrative example, list 1202 includes field 1400, field 1402, field 1404, field 1406, field 1408, and field 1410. As depicted, field 1406, and field 1408 have been selected. Portion 1204 includes field 1212, field 1214, field 1406, and field 1408 in this illustrative example.

In the illustrative example, fields added to portion 1204 from fields in first screen 1101 continue to show in portion 1204 when moving from first screen 1101 of the application to the second screen of the application. In this manner, operator 124 is able to use graphical user interface 1100 to select fields for portion 1204 for the group of reports 130 from multiple groups of fields located in multiple screens for the application.

Figure 15:
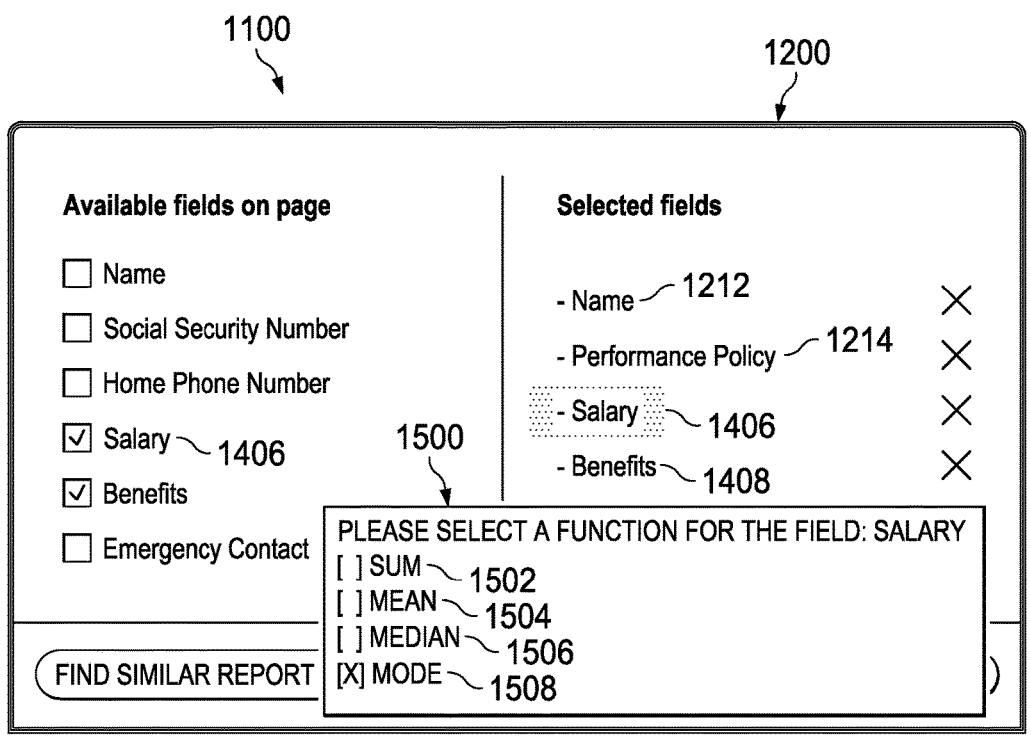
FIG. 15 is another illustration of a graphical user interface for generating reports in accordance with an illustrative embodiment.

With reference next to FIG. 15, another illustration of a graphical user interface for generating reports is depicted in accordance with an illustrative embodiment. In this illustration, field 1406 in portion 1204 has been selected.

As depicted, pop-up window 1500 is displayed in graphical user interface 1100 when field 1406 is selected. In this illustrative example, pop-up window 1500 includes function 1502, function 1504, function 1506, and function 1508. These functions are an example of the group of functions 804 shown in block form in FIG. 8.

In this illustrative example, function 1508 is selected. Function 1508 is a function that calculates the mode of salary in field 1406.

Figure 16:
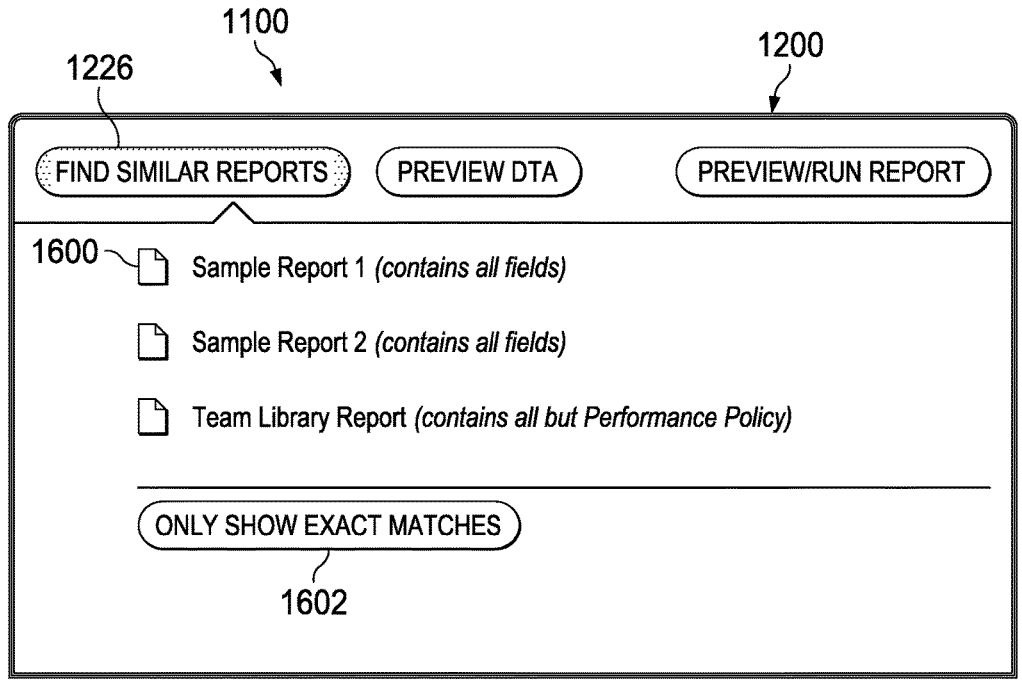
FIG. 16 is another illustration of a graphical user interface for generating reports in accordance with an illustrative embodiment.

With reference next to FIG. 16, another illustration of a graphical user interface for generating reports is depicted in accordance with an illustrative embodiment. In this illustration, button 1226 for beginning a process to search for reports has been selected.

As depicted, selection area 1200 includes list of existing reports 1600 when button 1226 is selected. List of existing reports 1600 is an example of the list of existing reports 1000 shown in block form in FIG. 10. List of existing reports 1600 shows descriptions of the reports in list of existing reports 1600. As depicted, the description of the reports includes the name of the reports. The description of the reports also includes a description of the fields in the reports that are also in portion 1204.

In this illustrative example, selection area 1200 includes button 1602. Button 1602 identifies whether all fields or one field in portion 1204 must be located in a report for the report to be included in list of existing reports 1600. When button 1602 is selected, all fields in portion 1204 must be located in a report for the report to be included in list of existing reports 1600. When button 1602 is not selected, at least one field in portion 1204 must be located in a report for the report to be included in list of existing reports 1600.

Figure 17:
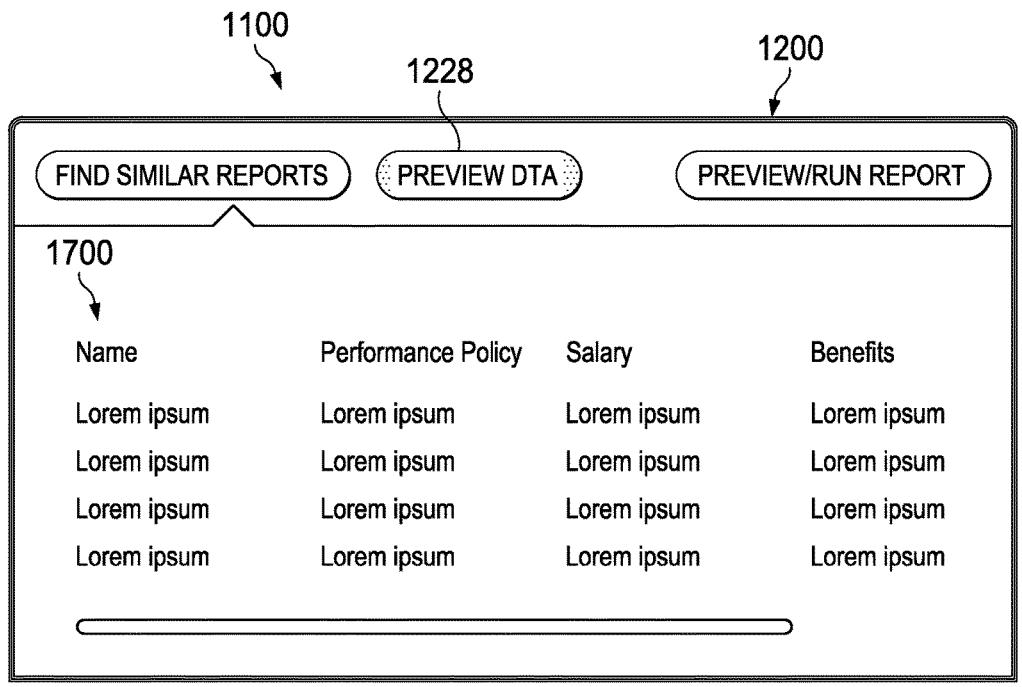
FIG. 17 is another illustration of a graphical user interface for generating reports in accordance with an illustrative embodiment.

With reference now to FIG. 17, another illustration of a graphical user interface for generating reports is depicted in accordance with an illustrative embodiment. In this illustration, button 1228 for displaying a preview of a report has been selected.

As depicted, selection area 1200 includes report 1700 when button 1228 is selected. Report 1700 is an example of a report in the group of reports 130. In this illustrative example, report 1700 is a table of values identified for portion 1204.

Figure 18:
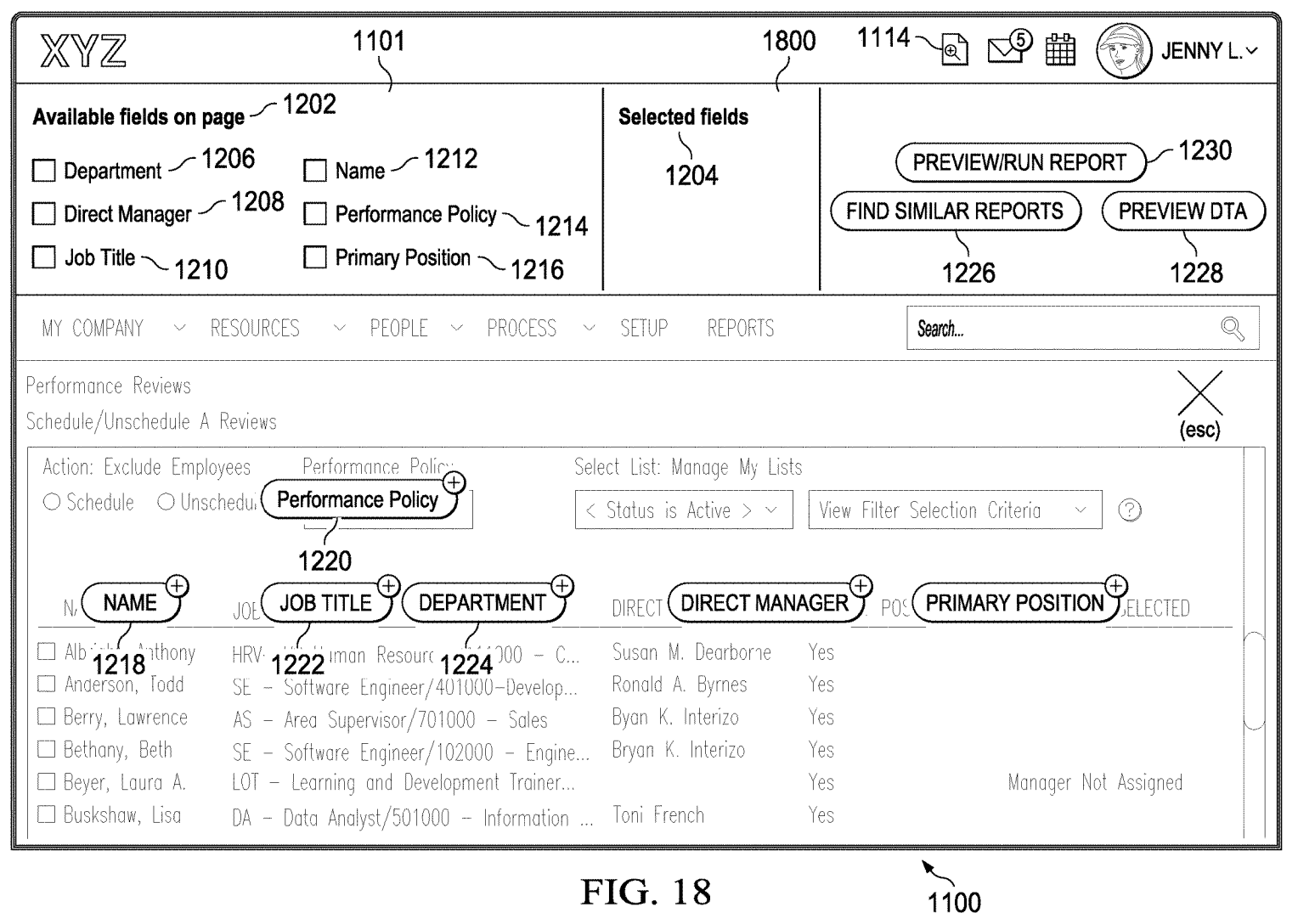

Turning to FIG. 18, another illustration of a graphical user interface for generating reports is depicted in accordance with an illustrative embodiment. In this illustration, icon 1114 has been selected.

As depicted, selection area 1800 is displayed in graphical user interface 1100 when icon 1114 is selected. In this illustrative example, selection area 1800 is a frame in first screen 1101. A frame is an area of a screen that is located in different locations. For example, the frame may be located in at least one of at the top, the left, the right, the center, the bottom, or some other suitable portion of the screen. Selection area 1800 is at the top of first screen 1101 in this illustrative example.

The illustration of the graphical user interfaces in FIGS. 11-18 are shown only as examples of some implementations for graphical user interface 120 shown in block form in FIG. 1. These examples are not meant to limit the manner in which graphical user interface 120 may be implemented in other illustrative examples.

For example, selection area 1800 may be located at a location selected from at least one of the top, the left, the right, the center, the bottom, or some other suitable portion of first screen 1101. In this example, operator 124 may use input device 128 to move selection area 1800 from a first portion of first screen 1101 to a second portion of first screen 1101.

As another example, selection area 1200 may be located on a different graphical user interface than graphical user interface 1100. As still another example, selection area 1200 may be displayed on a different display system than display system 122.

Figure 19:
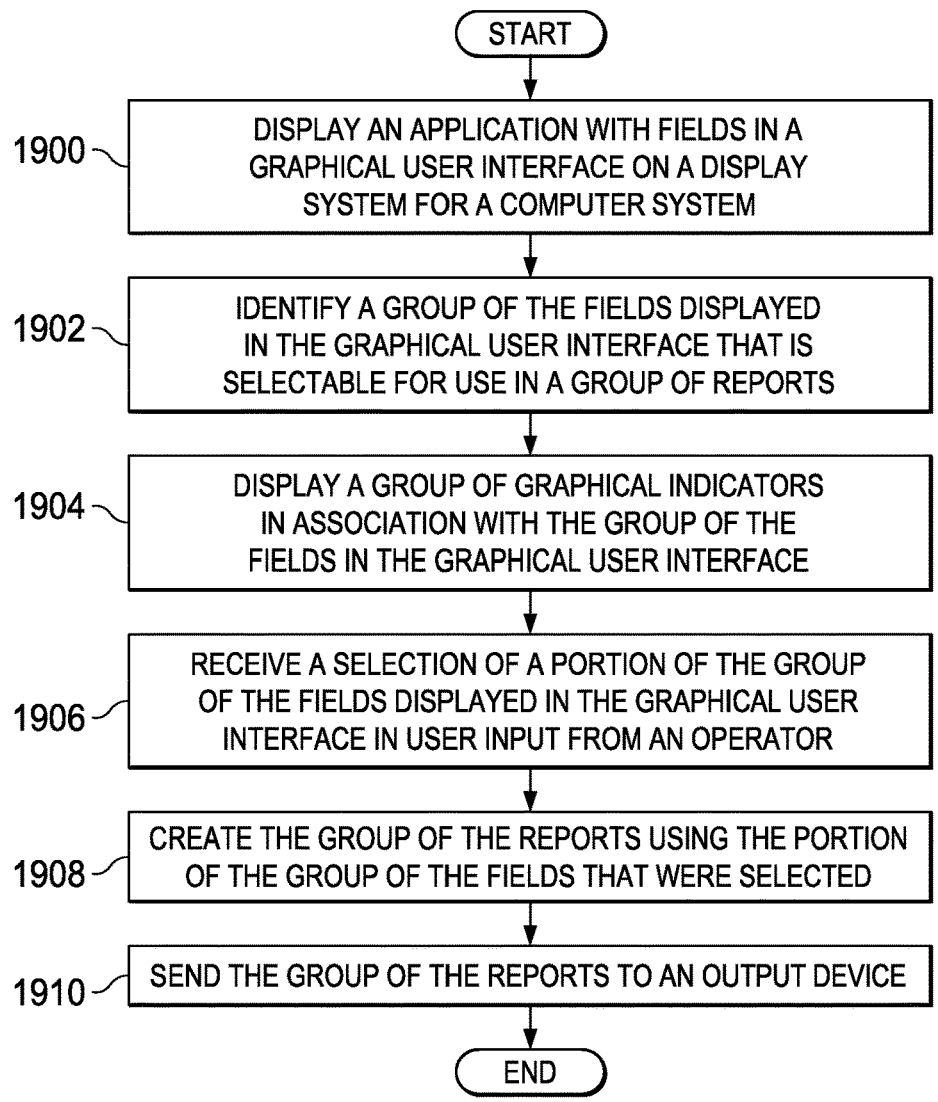
FIG. 19 is an illustration of a flowchart of a process for generating reports in accordance with an illustrative embodiment.

Turning next to FIG. 19, an illustration of a flowchart of a process for generating reports is depicted in accordance with an illustrative embodiment. The process illustrated in FIG. 19 may be implemented in information system 102 in FIG. 1. For example, the process may be implemented in report generator 134 in FIG. 1.

The process begins by displaying an application with fields in a graphical user interface on a display system for a computer system (step 1900). The application is used to perform transactions for an organization in this illustrative example. The process identifies a group of the fields displayed in the graphical user interface that is selectable for use in a group of reports (step 1902). In other words, the fields in step 1902 can be selected for use in a report.

The process displays a group of graphical indicators in association with the group of the fields in the graphical user interface (step 1904). The process receives a selection of a portion of the group of the fields displayed in the graphical user interface in user input from an operator (step 1906).

Next, the process creates the group of the reports using the portion of the group of the fields that were selected (step 1908). The process sends the group of the reports to an output device (step 1910), with the process terminating thereafter. The output device may be a hard disk or some other hardware storage system for a database. In another example, the output device may be printer, a display system, a projector, or some other hardware device.

In this manner the process enables performing the operation for an organization using the group of the reports more efficiently. The efficiency may occur through the ability to visualize the fields and their use in application and selecting fields based on the visualization rather than needing knowledge of how the fields are organized in storage such as in a database.

Figure 20:
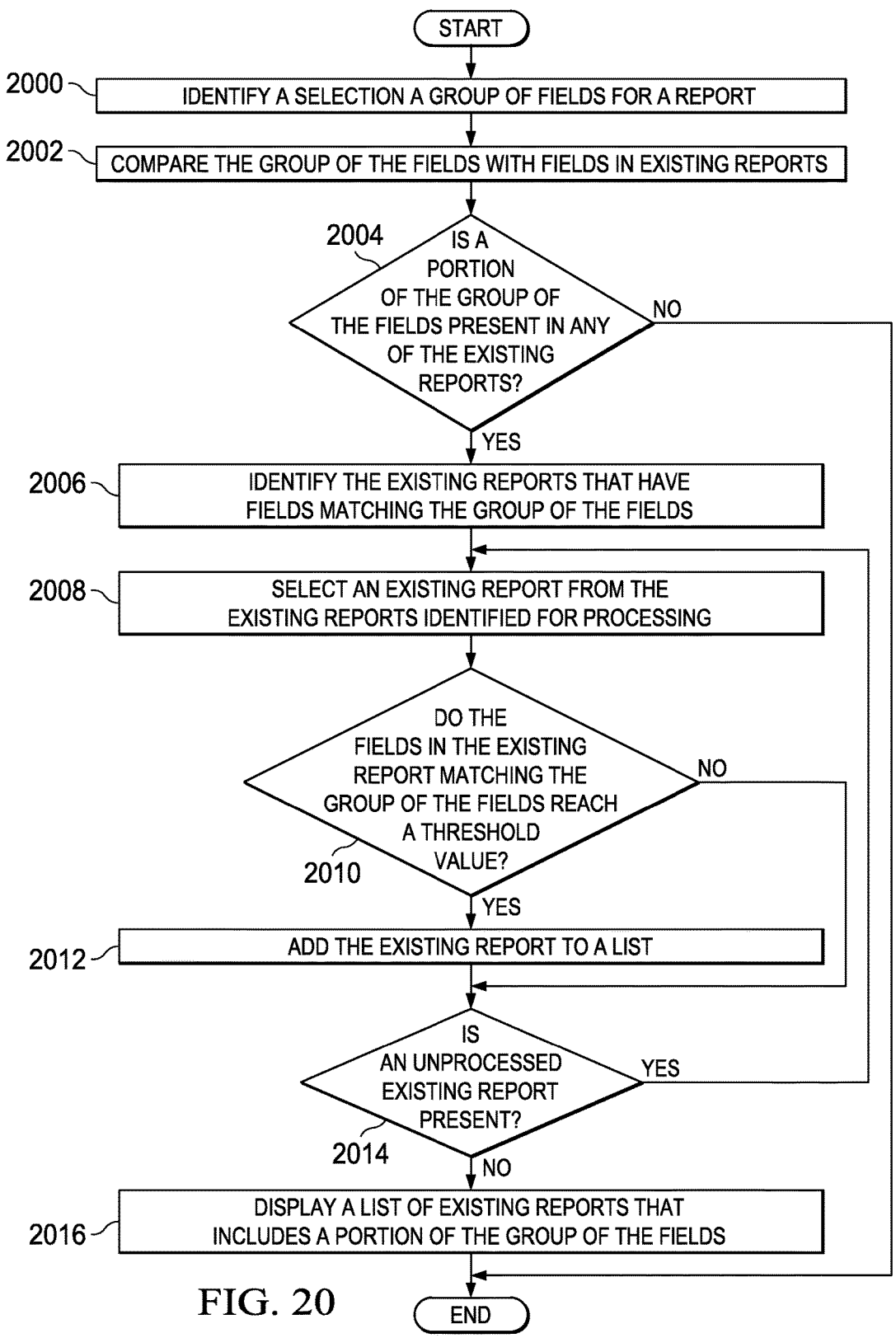
FIG. 20 is an illustration of a flowchart of a process for identifying similar reports in accordance with an illustrative embodiment.

Turning now to FIG. 20, an illustration of a flowchart of a process for identifying similar reports is depicted in accordance with an illustrative embodiment. The process illustrated in FIG. 20 may be implemented in information system 102 in FIG. 1. For example, the process may be implemented in report generator 134 in FIG. 1. This process may be implemented as part of a process for selecting fields for a report, such as the process in FIG. 19.

The process begins by identifying a selection a group of fields for a report (step 2000). The process compares the group of the fields with fields in existing reports (step 2002). A determination is made as to whether a portion of the group of the fields is present in any of the existing reports (step 2004).

If a portion of the group of the fields is present in the fields in the existing reports, the process identifies the existing reports that have fields matching the group of the fields (step 2006). An existing report is selected from the existing reports identified for processing (step 2008).

A determination is made as to whether the fields in the existing report matching the group of the fields reach a threshold value (step 2010). The threshold value is selected to define when enough of the group of the fields is present that makes the existing report a candidate for use by the operator. The threshold value may be, for example, all of the fields in the group of the fields, a percentage of the group of the fields, or a number of fields. The selection is based on when the match is sufficient to make the existing report useful or of interest to the operator.

If the fields in the existing report matching the group of the fields reach the threshold value, the existing report is added to a list (step 2012). The process determines whether an unprocessed existing report is present (step 2014). If an unprocessed existing report identified is present, the process returns to step 2008.

Otherwise, the process displays a list of existing reports that includes a portion of the group of the fields (step 2016), with the process terminating thereafter. With reference again to step 2004, if none of the existing reports includes a portion of the group of the fields, the process also terminates. With reference again to step 2010, if the fields in the existing report matching the group of fields do not reach a threshold value, the process, proceeds to step 2014.

Figure 21:
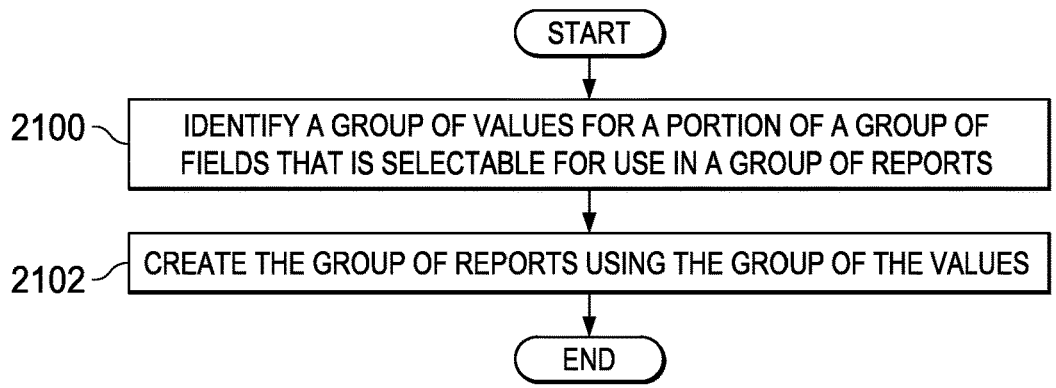
FIG. 21 is an illustration of a flowchart of a process for creating reports in accordance with an illustrative embodiment.

Turning next to FIG. 21, an illustration of a flowchart of a process for creating reports is depicted in accordance with an illustrative embodiment. The process illustrated in FIG. 21 is one example of an implementation for step 1908 in FIG. 19. The process illustrated in FIG. 21 may be implemented in information system 102 in FIG. 1. For example, the process may be implemented in reporting tool 204 in FIG. 9.

The process begins by identifying a group of values for a portion of a group of fields that is selectable for use in a group of reports (step 2100). For example, the process may retrieve the group of values for the portion of information in a database. When the group of values is located in database 160, the process may use structured query language (SQL) select statements to retrieve columns of information in database 160 for the portion of the group of the fields. As another example, the process may use a group of functions selected for the portion to generate the group of the values for the portion.

The process then creates the group of reports using the group of the values (step 2102), with the process terminating thereafter. For example, when a report in the group of reports is a table, the process may generate the table using the portion of the group of fields as the columns of the table, the group of values as the values in the table, and a group of labels for the portion as the headings for the columns of the table.

Figure 22:
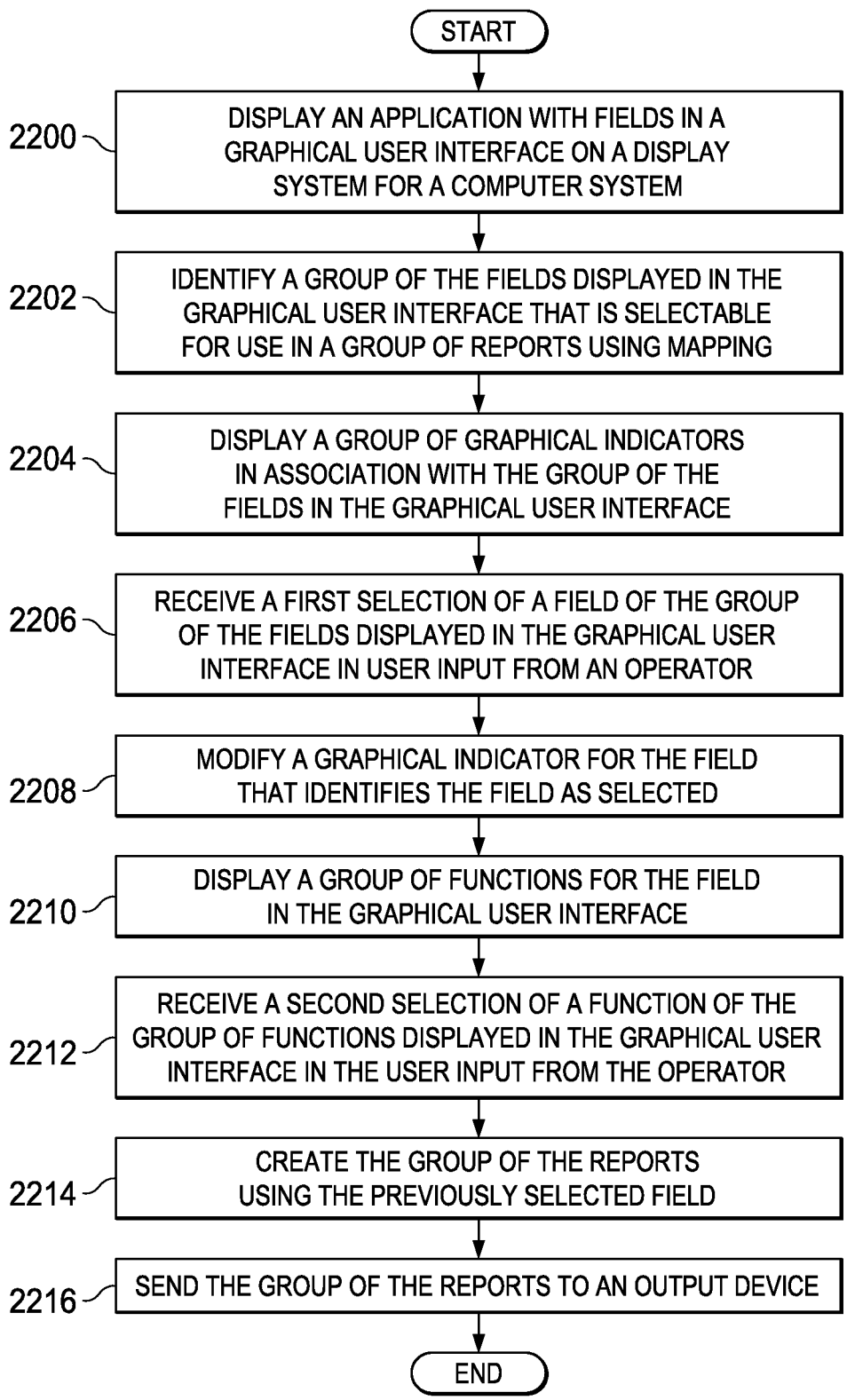
FIG. 22 is an illustration of a flowchart of a process for generating reports in accordance with an illustrative embodiment.

With reference to FIG. 22, an illustration of a flowchart of a process for generating reports is depicted in accordance with an illustrative embodiment. The process illustrated in FIG. 22 may be implemented in information system 102 in FIG. 1. For example, the process may be implemented in report generator 134 in FIGS. 1-2.

The process begins by displaying an application with fields in a graphical user interface on a display system for a computer system (step 2200). The application is used to perform transactions for an organization in this illustrative example. The process identifies a group of the fields displayed in the graphical user interface that is selectable for use in a group of reports using mapping (step 2202). The mapping in step 2202 provides an identification of which ones of the fields may be selected as the group of the fields for the group of reports.

The process next displays a group of graphical indicators in association with the group of the fields in the graphical user interface (step 2204). The process receives a first selection of a field of the group of the fields displayed in the graphical user interface in user input from an operator (step 2206). The process modifies a graphical indicator for the field that identifies the field as selected (step 2208).

The process displays a group of functions for the field in the graphical user interface (step 2210). The process receives a second selection of a function of the group of the functions displayed in the graphical user interface in the user input from the operator (step 2212). The function in step 2212 is at least one of a statistical function or a retrieval function that the process uses to generate a group of values for the field for the group of the reports.

The process creates the group of the reports using the previously selected field (step 2214). The previously selected field is the field selected in step 2206. The process then sends the group of the reports to an output device (step 2216), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 22 may perform steps 2214 and 2216 substantially concurrently with the receipt of the user input to at least one of the group of the fields in step 2206 or the group of functions in step 2212. As another example, step 1906 in FIG. 19 may be replaced with another step in FIG. 19 that includes the process receiving a selection of all of the group of the fields as the portion of the group of the fields in the user input from the operator.

Figure 23:
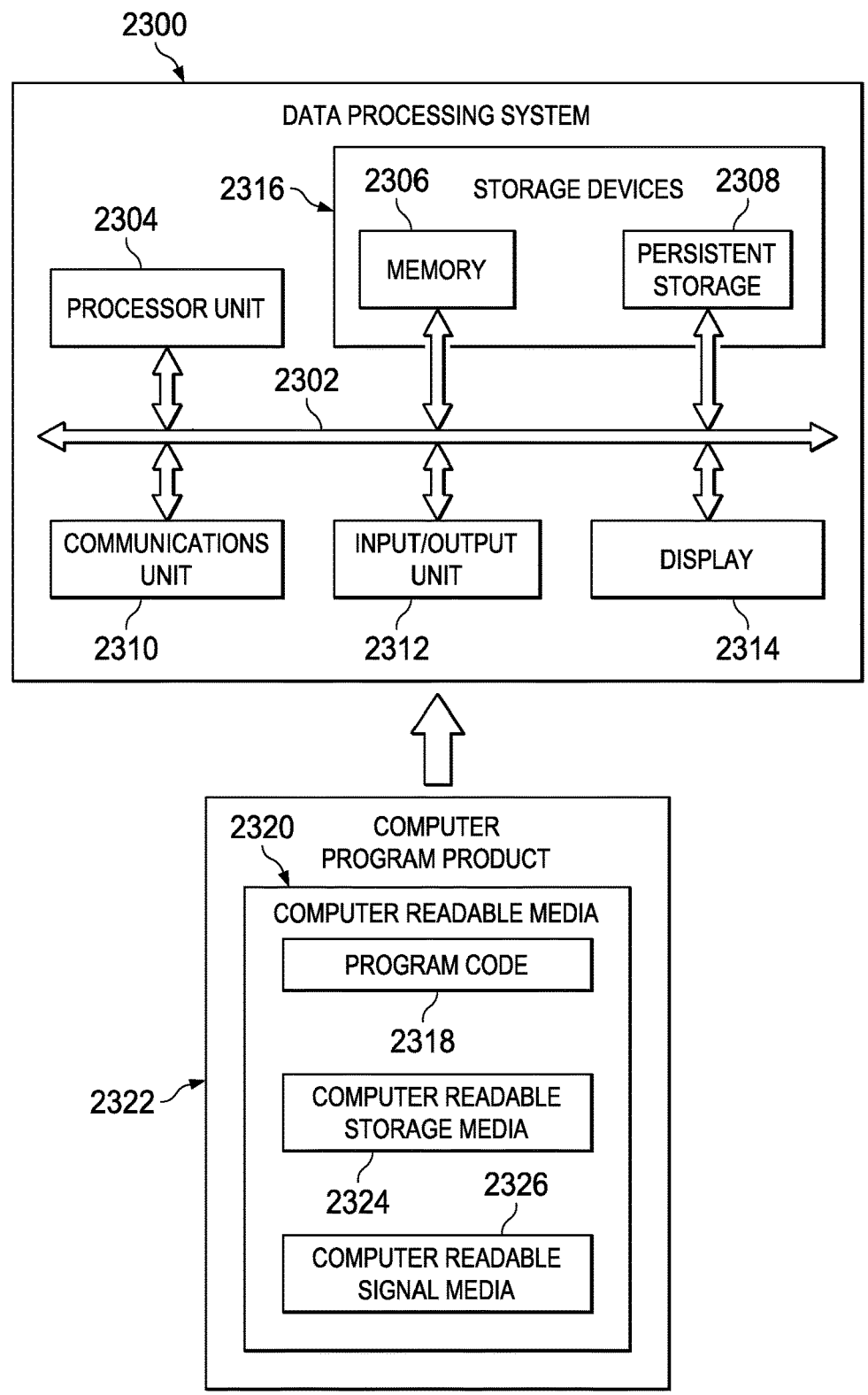
FIG. 23 is an illustration of a block diagram of a data processing system in accordance with an illustrative embodiment.

Turning now to FIG. 23, an illustration of a block diagram of a data processing system is depicted in accordance with an illustrative embodiment. Data processing system 2300 may be used to implement computer system 118. In this illustrative example, data processing system 2300 includes communications framework 2302, which provides communications between processor unit 2304, memory 2306, persistent storage 2308, communications unit 2310, input/output (I/O) unit 2312, and display 2314. In this example, communication framework may take the form of a bus system.

Processor unit 2304 serves to execute instructions for software that may be loaded into memory 2306. Processor unit 2304 may be a number of processors, a multi-processor core, or some other type of processor, depending on the particular implementation.

Memory 2306 and persistent storage 2308 are examples of storage devices 2316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2316 may also be referred to as computer readable storage devices in these illustrative examples. Memory 2306, in these examples, may be, for example, a random access memory or any other suitable volatile or non-volatile storage device. Persistent storage 2308 may take various forms, depending on the particular implementation.

For example, persistent storage 2308 may contain one or more components or devices. For example, persistent storage 2308 may be a hard drive, a flash memory, a rewritable optical disk, a rewritable magnetic tape, or some combination of the above. The media used by persistent storage 2308 also may be removable. For example, a removable hard drive may be used for persistent storage 2308.

Communications unit 2310, in these illustrative examples, provides for communications with other data processing systems or devices. In these illustrative examples, communications unit 2310 is a network interface card.

Input/output unit 2312 allows for input and output of data with other devices that may be connected to data processing system 2300. For example, input/output unit 2312 may provide a connection for user input through at least one of a keyboard, a mouse, or some other suitable input device. Further, input/output unit 2312 may send output to a printer. Display 2314 provides a mechanism to display information to a user.

Instructions for at least one of the operating system, applications, or programs may be located in storage devices 2316, which are in communication with processor unit 2304 through communications framework 2302. The processes of the different embodiments may be performed by processor unit 2304 using computer-implemented instructions, which may be located in a memory, such as memory 2306.

These instructions are referred to as program code, computer usable program code, or computer readable program code that may be read and executed by a processor in processor unit 2304. The program code in the different embodiments may be embodied on different physical or computer readable storage media, such as memory 2306 or persistent storage 2308.

Program code 2318 is located in a functional form on computer readable media 2320 that is selectively removable and may be loaded onto or transferred to data processing system 2300 for execution by processor unit 2304. Program code 2318 and computer readable media 2320 form computer program product 2322 in these illustrative examples. In one example, computer readable media 2320 may be computer readable storage media 2324 or computer readable signal media 2326. In these illustrative examples, computer readable storage media 2324 is a physical or tangible storage device used to store program code 2318 rather than a medium that propagates or transmits program code 2318.

Alternatively, program code 2318 may be transferred to data processing system 2300 using computer readable signal media 2326. Computer readable signal media 2326 may be, for example, a propagated data signal containing program code 2318. For example, computer readable signal media 2326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2300 are not meant to provide architectural limitations to the manner in which different embodiments may be implemented. The different illustrative embodiments may be implemented in a data processing system including components in addition to or in place of those illustrated for data processing system 2300. Other components shown in FIG. 23 can be varied from the illustrative examples shown. The different embodiments may be implemented using any hardware device or system capable of running program code 2318.

Thus, one or more of the illustrative examples that solves the technical problem with operators performing transactions being unable to generate reports as efficiently as desired without knowledge about how the information is stored.

In one illustrative example, a report generator system allows an operator to select a field for reports. The selection occurs while the operator is in an application used to generate a transaction that has information that may be used in a report. The operator may select fields before performing operations in the application for the transaction, while performing the operations, after performing the operations and completes the transaction, or some combination thereof. As a result, the operator may select fields for a report without having to leave the application to go to a specialized reporting program.

Further, the user is able to visualize the fields with labels for the fields that are familiar to the user as opposed to labels that are used in a database. In other words, the labels for the fields displayed with the information of interest for reports may not be the same as the labels used in a database for the information of interest.

In the illustrative example, the fields that can be selected are emphasized by graphical indicators associated with the fields. The emphasis may be, for example, highlighting or changing a color of labels for the fields, or some other suitable type of emphasis.

Thus, this technical solution has a technical effect that enables an operator to generate a report more efficiently. Additionally, the technical solution also may enable an operator to more easily generate a report without having knowledge about the manner in which the information is stored.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating reports comprising:
   displaying, by a computer system, an application with fields in a graphical user interface on a display system, wherein the application is used to perform transactions for an organization;
   identifying, by the computer system, a group of the fields displayed in the graphical user interface that is selectable for use in a group of reports;
   displaying, by the computer system, a group of graphical indicators, wherein the graphical indicators are overlain onto corresponding columns and labeled according to the corresponding columns in association with the group of the fields-in the graphical user interface;
   receiving, by the computer system, a selection of a portion of the group of the fields displayed in the graphical user interface in user input;
   creating, by the computer system, the group of the reports using the portion of the group of the fields; and
   sending, by the computer system, the group of the reports to an output device, enabling performing an operation for the organization using the group of the reports.

2. The method of claim 1 further comprising:
displaying, by the computer system, a selection area with a list of the group of the fields.

3. The method of claim 1 further comprising:
displaying, by the computer system, a list of existing reports that includes at least one of the portion of the group of the fields.

4. The method of claim 1, wherein displaying the group of the graphical indicators in association with the group of the fields comprises:
displaying, by the computer system, the group of the graphical indicators in association with a group of labels for the group of the fields that are displayed with the group of the fields in the graphical user interface.

5. The method of claim 1, wherein the group of the graphical indicators is selected from at least one of color, font, bolding, underlining, animation, italic, highlighting, an icon, an image, or intensity.

6. The method of claim 1, wherein the fields of the application are located in a group of screens for the application, and wherein a selection area is added to at least one of the group of the screens of the application when an icon in the graphical user interface is selected.

7. The method of claim 6, wherein the selection area is selected from at least one of a pop-up window or a frame in a screen for the application.

8. The method of claim 1, wherein the application includes a mapping that identifies which ones of the fields are selectable for use in the group of the reports.

9. The method of claim 1, wherein the selection is a first selection and further comprising:
displaying, by the computer system, a group of functions for a field in the portion of the group of the fields that are selectable when the field is selected for the group of the reports;
receiving, by the computer system, a second selection of a function from the group of the functions in the user input, wherein the function generates information relating to the field;
generating, by the computer system, the information using the function; and
including, by the computer system, the information generated by the function in the group of the reports.

10. A computer system comprising:
a display system; and
a report generator in communication with the display system, wherein the report generator displays an application with fields in a graphical user interface on the display system, wherein the application is used to perform transactions for an organization; identifies a group of the fields displayed in the graphical user interface that is selectable for use in a group of reports; displays a group of graphical indicators, wherein the graphical indicators are overlain onto corresponding columns and labeled according to the corresponding columns in association with the group of the fields in the graphical user interface; receives a selection of a portion of the group of the fields displayed in the graphical user interface in user input; creates the group of the reports using the portion of the group of the fields; and sends the group of the reports to an output device, enabling performing an operation for the organization using the group of the reports.

11. The computer system of claim 10, wherein the report generator displays a selection area with a list of the group of the fields.

12. The computer system of claim 10, wherein the report generator displays a list of existing reports that includes at least one of the portion of the group of the fields.

13. The computer system of claim 10, wherein in displaying the group of the graphical indicators in association with the group of the fields, the report generator displays the group of the graphical indicators in association with a group of labels for the group of the fields that are displayed with the group of the fields in the graphical user interface.

14. The computer system of claim 10, wherein the group of graphical indicators is selected from at least one of color, font, bolding, underlining, animation, italic, highlighting, an icon, an image, or intensity.

15. The computer system of claim 10, wherein the report generator is a service in a cloud computing system that is accessed by a client data processing system.

16. The computer system of claim 10, wherein the fields of the application are located in a group of screens for the application, and wherein a selection area is added to at least one of the group of the screens of the application when an icon in the graphical user interface is selected.

17. The computer system of claim 16, wherein the selection area is selected from at least one of one of a pop-up window or a frame in a screen for the application.

18. The computer system of claim 10, wherein the application includes a mapping that identifies which ones of the fields are selectable for use in the group of the reports.

19. The computer system of claim 10, wherein the selection is a first selection and wherein the report generator displays a group of functions for a field in the portion of the group of the fields that are selectable when the field is selected for the group of the reports; receives a second selection of a function from the group of the functions in the user input, wherein the function generates information relating to the field; generates the information using the function; and includes the information generated by the function in the group of the reports.

20. A computer program product for generating reports, the computer program product comprising:
a non-transitory computer readable storage media;
first program code, stored on the non-transitory computer readable storage media, for displaying an application with fields in a graphical user interface on a display system, wherein the application is used to perform transactions for an organization;
second program code, stored on the non-transitory computer readable storage media, for identifying a group of the fields displayed in the graphical user interface that is selectable for use in a group of the reports;
third program code, stored on the non-transitory computer readable storage media, for displaying a group of graphical indicators, wherein the graphical indicators are overlain onto corresponding columns and labeled according to the corresponding columns in association with the group of the fields in the graphical user interface;
fourth program code, stored on the non-transitory computer readable storage media, for receiving a selection of a portion of the group of the fields displayed in the graphical user interface in user input;
fifth program code, stored on the non-transitory computer readable storage media, for creating the group of the reports using the portion of the group of the fields; and
sixth program code, stored on the non-transitory computer readable storage media, for sending the group of the reports to an output device, enabling performing an operation for the organization using the group of the reports.

21. The computer program product of claim 20 further comprising:
    seventh program code, stored on the non-transitory computer readable storage media, for displaying a selection area with a list of the group of the fields.

22. The computer program product of claim 20 further comprising:
    seventh program code, stored on the non-transitory computer readable storage media, for displaying a list of existing reports that includes at least one of the portion of the group of the fields.

23. The computer program product of claim 20, wherein the third program code comprises:
    program code, stored on the non-transitory computer readable storage media, for displaying the group of the graphical indicators in association with a group of labels for the group of the fields that are displayed with the group of the fields in the graphical user interface.

24. The computer program product of claim 21, wherein the fields of the application are located in a group of screens for the application, and wherein a selection area is added to at least one of the group of the screens of the application when an icon in the graphical user interface is selected.

25. The computer program product of claim 20, wherein the selection is a first selection and the application includes a mapping that identifies which ones of the fields are selectable for use in the group of the reports and further comprising:
    seventh program code, stored on the non-transitory computer readable storage media, for displaying a group of functions for a field in the portion of the group of the fields that are selectable when the field is selected for the group of the reports;
    eighth program code, stored on the non-transitory computer readable storage media, for receiving a second selection of a function from the group of the functions in the user input, wherein the function generates information relating to the field;
    ninth program code, stored on the non-transitory computer readable storage media, for generating the information using the function; and
    tenth program code, stored on the non-transitory computer readable storage media, for including the information generated by the function in the group of the reports.

* * * * *